(12) United States Patent
Debize et al.

(10) Patent No.: US 11,954,421 B2
(45) Date of Patent: Apr. 9, 2024

(54) REDUCING DATA USAGE FOR RENDERING STATE CHANGES

(71) Applicant: Content Square SAS, Paris (FR)

(72) Inventors: Martin Debize, Paris (FR); Xavier Coutin, Paris (FR); Ludovic Heyberger, Paris (FR); Jerome Cayet, Paris (FR); Christophe Kalenzaga, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 18/103,822

(22) Filed: Jan. 31, 2023

(65) Prior Publication Data

US 2023/0351095 A1 Nov. 2, 2023

Related U.S. Application Data

(60) Provisional application No. 63/336,681, filed on Apr. 29, 2022.

(51) Int. Cl.
| | |
|---|---|
| *G06F 40/117* | (2020.01) |
| *G06F 3/0485* | (2022.01) |
| *G06F 40/143* | (2020.01) |
| *G06F 40/154* | (2020.01) |

(52) U.S. Cl.
CPC .......... *G06F 40/117* (2020.01); *G06F 3/0485* (2013.01); *G06F 40/143* (2020.01); *G06F 40/154* (2020.01)

(58) Field of Classification Search
CPC .... G06F 40/117; G06F 3/0485; G06F 40/143; G06F 40/154
See application file for complete search history.

(56) References Cited

U.S. PATENT DOCUMENTS

| | | | | |
|---|---|---|---|---|
| 10,430,212 B1* | 10/2019 | Bekmambetov | ...... | G06F 16/958 |
| 11,567,852 B1* | 1/2023 | Tatum | ................. | G06F 11/302 |
| 2002/0062369 A1* | 5/2002 | von Klopp | ............ | G06F 16/955 |
| | | | | 709/224 |
| 2002/0169781 A1* | 11/2002 | Poole | ................. | G06F 21/6218 |
| 2003/0164855 A1* | 9/2003 | Grant | ...................... | G06F 16/51 |
| | | | | 707/E17.02 |
| 2010/0031167 A1* | 2/2010 | Roytman | ............... | G06F 16/972 |
| | | | | 715/760 |
| 2015/0186344 A1* | 7/2015 | Leventhal | ............. | G06F 40/106 |
| | | | | 715/238 |

(Continued)

*Primary Examiner* — Keith D Bloomquist
(74) *Attorney, Agent, or Firm* — Schwegman Lundberg & Woessner, P.A.

(57) ABSTRACT

The subject technology receives, from a first client device, a set of requests for recording user activity detected on a mobile application executing on the first client device. The subject technology determines that a first request from the set of requests includes a change in position for an element of a screen of the mobile application. The subject technology determines a previous timestamp of a set of previous properties including a previous change in position for the element of the screen. The subject technology determines a transition time between a current timestamp and the previous timestamp. The subject technology generates, using a style sheet language, a linear transition based at least in part on the transition time. The subject technology adds the linear transition to a style of a markup language element corresponding to the element.

30 Claims, 15 Drawing Sheets

(56) References Cited

U.S. PATENT DOCUMENTS

2015/0193810 A1\* 7/2015 Lidow ................ G06Q 30/0241
705/14.4
2020/0310833 A1\* 10/2020 Hally ...................... G06F 9/451

\* cited by examiner

402

```
                    {
                      "nodeType": 1,
                      "attributes": [
                        {
                          "name": "id",
                          "value": "frog-container"
                        },
                        {
                          "name": "style",
                          "value": *
                            background-color: rgb(0, 0, 0, 0):
                            width: 500px:
  {                       height: 200px:
  "id": "frog-container"  top: 0:
  "style": {              left: 0:
    "x": 0,               position: absolute:
    "y": 0,             "
    "bg" :'#00000000',    }
    "alpha": 0.5,       ]                      <div id="frog-container"
    "bmp": "base64",    "localName": 'div',        style="...">
    "height": 200,      "children":[]          </div>
    "width": 500        }
  }
}
```

REDUCING DATA USAGE FOR RENDERING STATE CHANGES

PRIORITY CLAIM

This application claims the benefit of priority of U.S. Provisional Patent Application No. 63/336,681, filed Apr. 29, 2022, which is hereby incorporated by reference herein in its entirety for all purposes.

BACKGROUND

The Internet is a collection of disparate computer systems which use a common protocol to communicate with each other. A common use of the Internet is to access World Wide Web (web) pages. Web pages are typically stored on a server and remotely accessed by a client over the Internet using a web browser.

To increase user visitations and revenue, websites have become very sophisticated. Websites typically include web pages that provide information to users, advertise products or services to users and/or provide site search functions for users. A problem for website owners is how to determine how successful the website is, for example, whether the informational or other needs of users are met and whether the users are purchasing goods and services advertised on their site.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Embodiments of the subject technology described herein provide techniques for recording user activity (events, and the like) on mobile applications to generate session replays that enable playback of such user activity on a given client device. Due to inherent differences between different mobile applications and mobile devices that execute such applications, there could be difficulty in recording user activity in a manner that is performant and scalable.

By providing such playback of user sessions, different insights can be determined to facilitate improved debugging of problematic areas of such mobile applications, identifying areas that could be targeted for improvements, among other types of insights. It is therefore appreciated that improving such areas thereby improves the functionality of a computer (e.g., the subject system as described further herein) by at least enabling resolving errors that occur within mobile applications that the subject system performs recording of user activity thereon.

Networked Computing Environment

Figure 1:
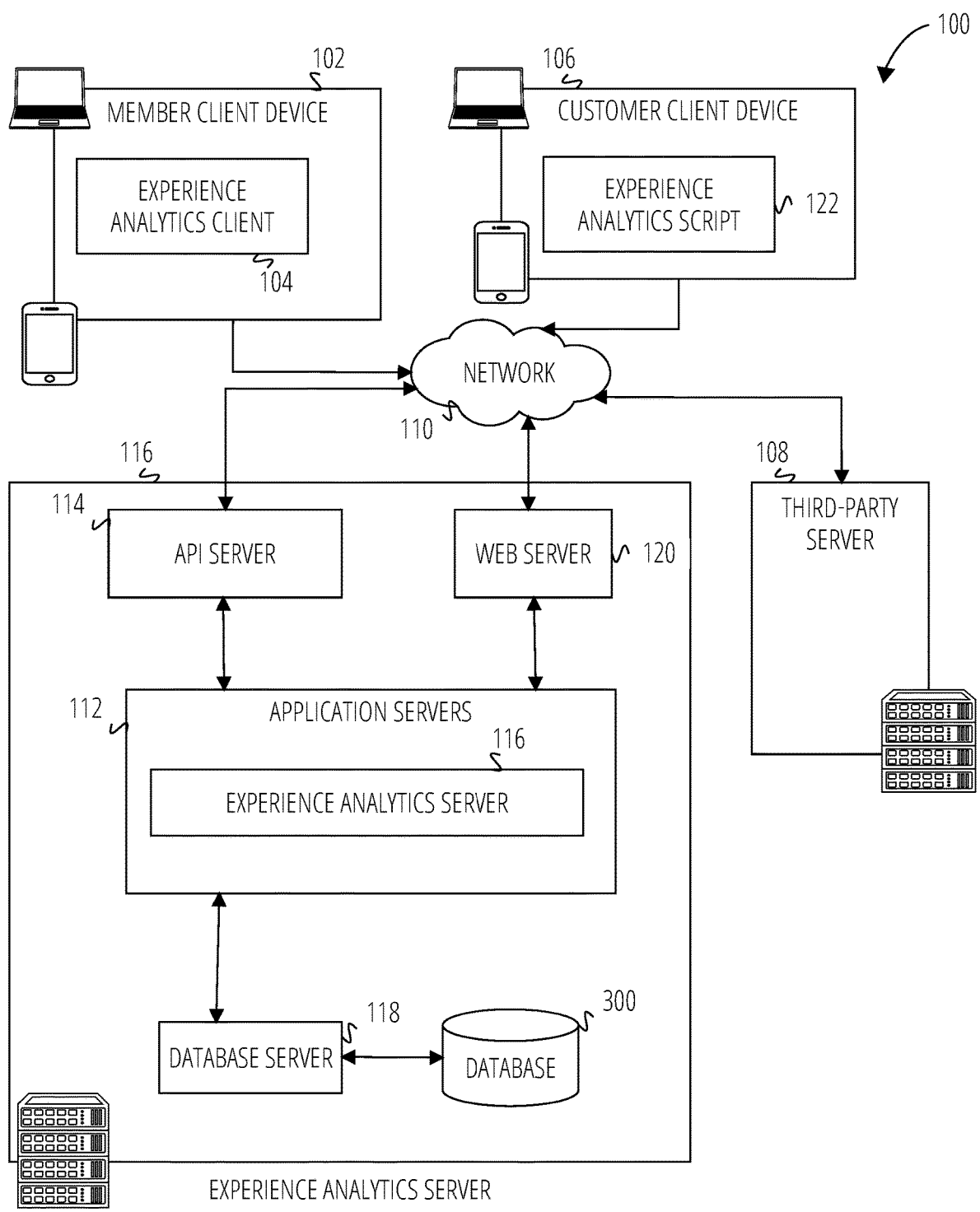
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 106, and multiple instances of a third-party server 108.

The member client device 102 is associated with a client of the experience analytics system 100 that has a website hosted on by the client's third-party server 108. For example, the client can be a retail store that has an online retail web site that is hosted on a third-party server 108. An agent of the client (e.g., a web administrator, an employee, etc.) can be the user of the member client device 102.

Each of the member client devices 102 hosts a number of applications, including an experience analytics client 104. Each experience analytics client 104 is communicatively coupled with an experience analytics server 116 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications (e.g., Chrome, Safari, etc.). The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can users navigating a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server 116. The SDK includes Application Programming Interfaces (APIs) with functions that can be called or invoked by the client's native application.

In one example, the experience analytics script 122 records data including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The experience analytics script 122 transmits the data to experience analytics server 116 via the network 110. In another example, the experience analytics script 122 transmits the data to the third-party server 108 and the data can be transmitted from the third-party server 108 to the experience analytics server 116.

An experience analytics client 104 is able to communicate and exchange data with the experience analytics server 116 via the network 110. The data exchanged between the experience analytics client 104 and the experience analytics server 116, includes functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server 116 supports various services and operations that are provided to the experience analytics client 104. Such operations include transmitting data to and receiving data from the experience analytics client 104. Data exchanges to and from the experience analytics server 116 are invoked and controlled through functions available via user interfaces (UIs) of the experience analytics client 104.

The experience analytics server 116 provides server-side functionality via the network 110 to a particular experience analytics client 104. While certain functions of the experience analytics system 100 are described herein as being performed by either an experience analytics client 104 or by the experience analytics server 116, the location of certain functionality either within the experience analytics client 104 or the experience analytics server 116 may be a design choice. For example, it may be technically preferable to initially deploy certain technology and functionality within the experience analytics server 116 but to later migrate this technology and functionality to the experience analytics client 104 where a member client device 102 has sufficient processing capacity.

Turning now specifically to the experience analytics server 116, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112, and provides web-based interfaces to the application servers 112. To this end, the web server 120 processes incoming network requests over the Hypertext Transfer Protocol (HTTP) and several other related protocols.

In an embodiment, a storage platform can provide database server 118 and database server 118 includes multiple data storage devices (which may not be hosted by experience analytics server 116). In some embodiments, the data storage devices are cloud-based storage devices located in one or more geographic locations. For example, the data storage devices may be part of a public cloud infrastructure or a private cloud infrastructure. The data storage devices may be hard disk drives (HDDs), solid state drives (SSDs), storage clusters, AMAZON S3 storage systems or any other data storage technology. Additionally, the aforementioned storage platform may implement distributed file systems (such as Hadoop Distributed File Systems (HDFS)), object storage systems, and the like.

The API server 114 receives and transmits message data (e.g., commands and message payloads) between the member client device 102 and the application servers 112. Specifically, the API server 114 provides a set of interfaces (e.g., routines and protocols) that can be called or queried by the experience analytics client 104 or the experience analytics script 122 in order to invoke functionality of the application servers 112. The API server 114 exposes to the experience analytics client 104 various functions supported by the application servers 112, including generating information on errors, insights, merchandising information, adaptability information, images, graphs providing visualizations of experience analytics, session replay videos, zoning and overlays to be applied on the web site, etc.

The application servers 112 host a number of server applications and subsystems, including for example an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, etc. received from multiple instances of the experience analytics script 122 on customer client devices 106. The experience analytics server 116 implements processing technologies and functions, related to generating user interfaces including information on errors, insights, merchandising information, adaptability information, images, graphs providing visualizations of experience analytics, session replay videos, zoning and overlays to be applied on the website, etc. Other processor and memory intensive processing of data may also be performed server-side by the experience analytics server 116, in view of the hardware requirements for such processing.

System Architecture

Figure 2:
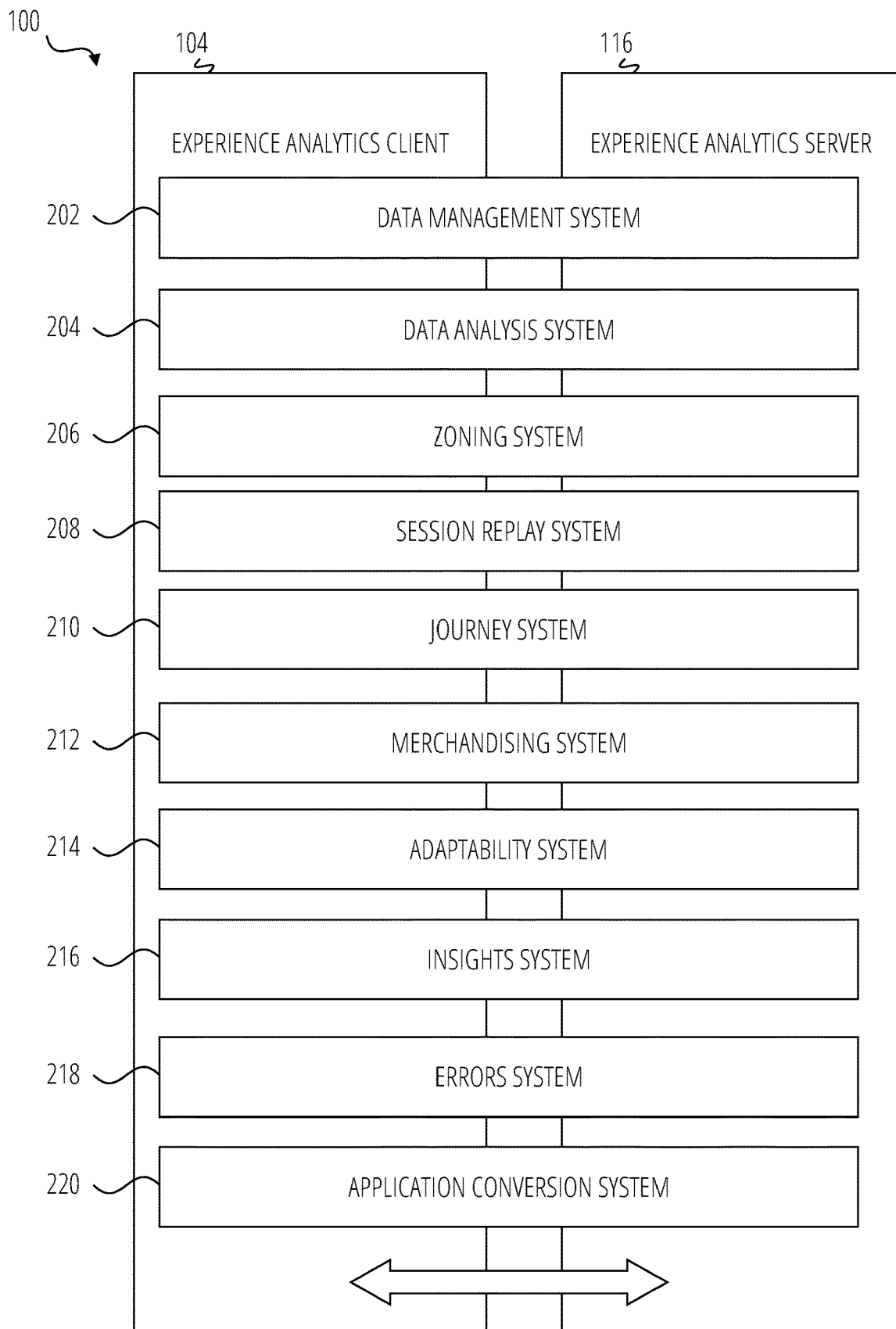
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual visitor session on the client's website. For example, a user visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversion, angry customers, errors in the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website, and illustrates the visited pages and in order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on a conversions (e.g., sales, revenue) associated with a placement or zone in the client website.

The adaptability system 214 is responsible for creating accessible digital experiences for the client's web site to be displayed by the customer client devices 106 for users' that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can analyze the data from the experience analytics script 122 to determine whether an accessibility-enhanced version of the client's website is needed and generates the accessibility-enhanced version of the client's website to be displayed by the customer client device 106.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client 104 on within a dashboard of a user interface, as a pop-up element, as a separate panel, etc. In this example, the insights system 216 is responsible for generating an insights interface to be displayed by the member client device 102 via the experience analytics client 104. In another example, the insights can be incorporated in another interface such as the zoning interface, the session replay, the journey interface, or merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that causes frustration to the users (e.g., users on customer client devices 106 visiting the client's website). The errors can also include causes of looping behaviors by the users, in-page issues such as unresponsive call to actions and slow loading pages, etc. The errors can be displayed by the member client devices 102 via the experience analytics client 104 on within a dashboard of a user interface, as a pop-up element, as a separate panel, etc. In this example, the errors system 218 is responsible for generating an errors interface to be displayed by the member client device 102 via the experience analytics client 104. In another example, the insights can be incorporated in another interface such as the zoning interface, the session replay, the journey interface, or merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, merchandising interface, insights interface, and errors interface to be displayed by the member client device 102 via the experience analytics client 104. The application conversion system 220 generates an accessibility-enhanced version of the client's mobile application to be displayed by the customer client devices 106.

As mentioned above, session replay system 208 provides session replay(s) of sessions for a given mobile application that executes on the customer client device 106. In an embodiment, the session replay system 208 enables a session player that provide playback of an entire user session for a particular user. The session player can be accessed by the member client device 102 for playback of sessions when the session player is executed by the session replay system 208. Alternatively or conjunctively, member client device 102 can execute a session player locally which communicates with the session replay system 208 (and, if needed, other components of experience analytics system 100) to enable playback of sessions. In an embodiment, experience analytics client 104, executing on member client device 102, can provide the functionality of the aforementioned session player for playback of session(s).

A session replay for a mobile application (e.g., application executing on a mobile device such as a smartphone, and the like) is basically a visualization of a flow of events representing states of screens at a given moment. The events are regrouped by sessions and sorted by dates (e.g., timestamps). A batch of events are received and session replay system 208 can replay the events using a player that performs a conversion of a description of the screen to an HTML document that changes for each event received.

The following describes three main aspects for implementing session replay for a mobile application:
- a session replay SDK (e.g., installed on customer client device 106) sends events representing a screen or a part of a screen for each mutation of those screens, for each client, at a given moment for a given session to a data transformation (DT) pipeline (which includes a set of components discussed further herein)
- The DT pipeline sorts and regroups those events to have coherent sessions for each client and make them available to session replay system 208. In an implementation, DT pipeline (or components thereof) may be provided by API server 114.
- The session replay system 208 gets a session (batch of events), for a given client (e.g., customer client device 106), and replays it in a session player The following discussion relates to how sessions and session metadata (e.g., any metadata corresponding to such sessions) are received prior to being transformed into a format for session replay.

In an embodiment, member client device 102 (or experience analytics server 116) includes a sessions service (e.g., application that executes in the "background", or a service that executes on a server or device) that performs operations to fetch metadata and events for sessions that occur in a mobile application executing on the customer client device 106. In an implementation, customer client device 106 includes a software development kit (SDK), which may be utilized by the sessions service, that sends events and associated metadata to session replay system 208 (or another appropriate component of experience analytics server 116 such as API server 114). When a session is recorded using the SDK (referred to herein as "session replay SDK"), the following is being sent to a DT pipeline through a specific endpoint (e.g., experience analytics server 116): one screen, multiple requests, each one being a batch of a number of events (e.g., 50). Each request includes a payload containing a batch of events (e.g., 50) that is sent through an array data structure for the screen and for the session. Since there can be multiple requests sent for a given screen, the endpoint receives another parameter that allows classifying the batches of events in order for one screen (e.g., a parameter ri that goes from 1 to n, where n is the total number of batches for one screen). This specific parameter allows the DT pipeline to store, in order, in a cloud storage device or system (e.g., Amazon S3) the different batches for a given screen so that the events can be retrieved in the right order by a session player via an API provided by the DT pipeline.

The following is an example of such a request as mentioned above:
https://ka123ABC.net/v2/recording-mobile?pid=4567&uu=8E2F9CD7-F406-4917-906D-80F136248663A&sn=3&pn=8&ri=4&v=4.3.1&rt=5

The above request has a payload including a batch of events (50) sent through an array for the screen pn=8, for the session sn=3.

The following shows an example of a payload: the payload (body) includes raw data that can be stored on a cloud storage system (e.g., Amazon S3, and the like), the metadata is sent via the query parameters of the previous request as shown in the following:

---

[{"styleChanges":{"y":−387},"type":3,"recordingId":−1234582774678010030,"timestampMs":1624288001536},
{"styleChanges":{"y":368},"type":3,"recordingId":−1234568106901129357,"timestampMs":1624288001536},

```
{"styleChanges":{"y":368},"type":3,"recordingId":1234593835134554087,"timestampMs":162
4288001536}, {"styleChanges":{"y":152},"type":3,"recordingId":-
1234505634075608520,"timestampMs":1624288001536},
{"styleChanges":{"y":402},"type":3,"recordingId":-
1234547542264388180,"timestampMs":1624288001536},...
```

In an embodiment, after storing data in the cloud storage system, the data is available immediately dependent on a time for completing a storage or write operation(s) by the cloud storage system. For example, experience analytics server 116 (or API server 114, or another endpoint) can retrieve files from the cloud storage system that correspond to the different batches of events sent previously for a given screen of the mobile application.

The following is an example of a request to retrieve data stored in the cloud storage system:

```
GET https://hpgm123ABC.io/session-replay/v1/projects/4567
/getPayloadsForPageview?&userIdHashed=12345592578362406478&pageNumb
er=14&sessionNumber=1
```

In the above example, pageNumber matches the pn param from the previous SDK request, sessionNumber matches the sn param from the previous session replay SDK request, and userIdHashed is determined from the uu param from the previous session replay SDK request (e.g., it is the same ID but hashed).

The above will provide an array including the batches of events for a given user, given session and a given screen of this session. From this information, a session can be replayed after undergoing transformation and replay operations that will be discussed further below.

With the previous request(s) sending data, after all batches have been stored in the cloud storage system, DT pipeline determines, from the timestamps of the events that have been sent, a set of durations of screenviews and sessions. The set of durations are then stored (e.g., by experience analytics server 116, or API server 114, or another component) in local storage (e.g., database 300) along with metadata related to an OS version, application version of the device (e.g., customer client device 106) collecting the data, and a screen name will be stored for each screen of the session.

The following is an example of a request for metadata:

```
POST https://hpgm123ABC.io/session-replay/v1/projects/4567
/listPagesForSession
{"isMobile":true,"userIdHashed":"12345592578362408746","sessionNumb
er":1,"achievedGoals":[ ]," excludeGreyRecordings":false}
```

From the above, an array describing the screens is returned, and this data can be provided for display as shown in the example user interface of FIG. 10 discussed further below when listing the sessions and corresponding screens.

The following an example of a response from the above request for metadata:

```
[
{ "userIdHashed":"12345592578362408746",
"numberOfTriggeredEvents":0, "sessionNumber":1, "pageNumber":1,
"recordingOrigin":"Unknown", "viewDateTime":"2021-05-31T16:31:33Z",
"durationMs":9761, "deviceId":4, "height":667, "width":375,
"path":"home page", "fullUrl":"app-
ios://uisplitviewcontrollerbuildinfobar?title=home% 20page",
"greyRecordingReason":1, "hasPlaybackRecorded":2,
"engagementDurationMs":0 },
{ "userIdHashed":"12345592578362408746",
"numberOfTriggeredEvents":0, "sessionNumber":1, "pageNumber":2,
"recordingOrigin":"Unknown", "viewDateTime":"2021-05-31T16:31:44Z",
"durationMs":3068, "deviceId":4, "height":667, "width":375,
"path":"debugflags", "fullUrl":"appios://
uisplitviewcontroller_uisplitviewcontrollerpanelimplview?
title=debugflags", "greyRecordingReason":1,
"hasPlaybackRecorded":2, "engagementDurationMs":0 }...
]
```

The following discussion relates to type of events that are sent by the session replay SDK on the customer client device 106. In an embodiment, events discussed below can occur after the aforementioned retrieval of data by the DT pipeline (e.g., API server 114)

Type of Events

In an implementation, the session replay SDK utilizes the following format for an event:

```
{
type: number,
timestampMs: number
}
```

In an implementation, a session player utilizes the following format for an event:

```
{
type: number, // type of event
date: number, // moment where the event is replayed
args: any[ ], // any arguments necessary to replay an event
}
```

To re-use the SDK format for an event, a transformation is performed to be compatible with the session player format supported by an API of the session player, which may be provided by API server 114 in an implementation.

Transforming to the Player API

In an example, the following session replay SDK event is received:

```
{
"type": 3, // properties mutation
"timestampMs": 1603197494371, the date when the event is going to be played
"recordingId": 1234579321937029000, // the id of element which style is going to change
"styleChanges": {
"y": 460 // a new position vertically for an existing element in the session }
},
```

The above event is in the list of all events that was received in one screenview. As referred to herein, the term "screenview" or "screen view" includes information and metadata that can be utilized to generate a particular representation of a mobile application's screen at a time of an event. When receiving the list of events, subsequently, the events are passed to a mobile event transformer service which performs a set of pre-processing operations. In an implementation, the mobile event transformer service iterates on all events once to transform the events to the format compatible with a given target API (e.g., the session player API). In above example, after the transformation, the following transformed event can be provided:

```
{
"type": 3,
"date": 1603197494371,
"args": [8876779321937029000, { cssText: "top: 460px;" }]
}
```

As seen in the above, the format of the initial event now matches the format of the API of the player, and the style property of the previous event has been transformed to a CSS property.

Cache Images

In an embodiment, images are sent as bitmap hashes in a styling attribute bitmap image (e.g., bitmap image file or format). To improve and reduce data consumption of the session replay SDK, a key hash representing the bitmap image is sent, and the key hash is stored under a bitmap image hash field. After receiving a insertion event with, in the styling attributes, a bitmap image and a bitmap image hash to identify it, the session replay SDK sends only the bitmap image hash information to avoid sending superfluous data with a repeated bitmap image each time. The bitmap image with its bitmap image hash is then stored in memory during a preprocessing phase and each time a bitmap image hash is encountered in an event, a lookup operation is performed in the cache to get the associated bitmap image.

Thus, when iterating on the list of events during the preprocessing phase, a bitmap image and associated bitmap image hash are stored. When performing the transformation on the second iteration of events, including creating an HTML element corresponding to the SDK mutation that was sent, the bitmap image is retrieved from the cache to create the HTML element that will be sent to the session player.

As discussed below in FIG. 4, a transformation of an event is described in further detail.

Data Architecture

Figure 3:
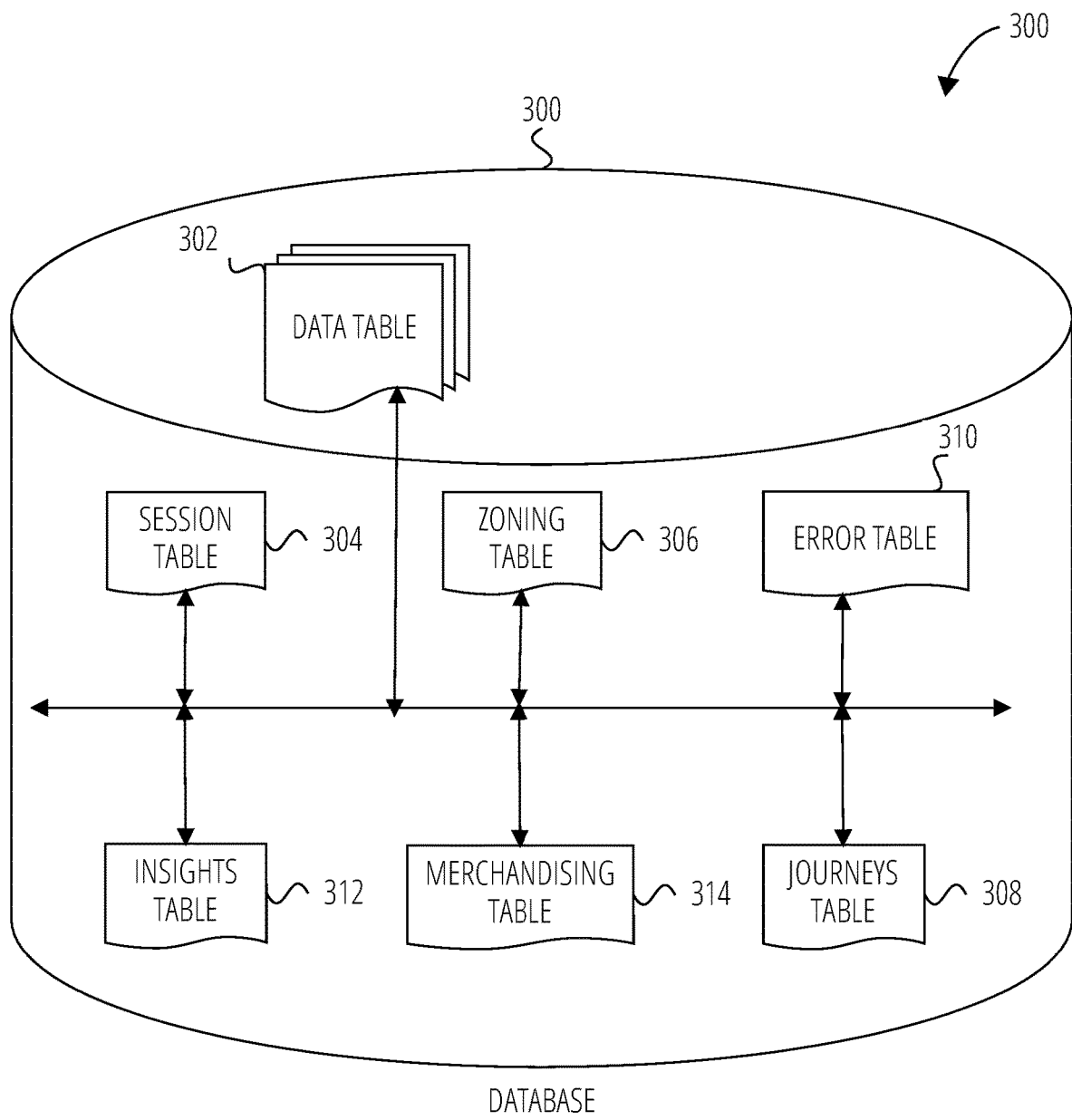
FIG. 3 is a diagrammatic representation of a data structure as maintained in a database, in accordance with some examples.

FIG. 3 is a schematic diagram illustrating database 300, which may be stored in the database 300 of the experience analytics server 116, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the web site being displayed on the customer client device 106, the elements on the web site being displayed or visible on the interface of the customer client device 106, the text inputs by the user into the website, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays for each of the client's websites and native applications.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights table 312.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the website or application, etc.

In an embodiment, a storage platform can provide database 300 where the data is stored on multiple data storage devices (which may not be hosted by experience analytics server 116). As mentioned before, such data storage devices can be cloud-based storage devices located in one or more geographic locations, such as AMAZON S3 storage systems or any other data storage technology.

In an implementation, payload data (as discussed in FIG. 2) that is stored in a cloud storage system (e.g., AMAZON S3) is available immediately (e.g., because such data is stored as it is in S3, and the time to store it is dependent on the time of writing a file on AMAZON S3).

The following discussion relates to a dictionary of events.

Mutation Insert

A mutation insert is a type of event that includes a description of the screen as JavaScript Object Notation (JSON) with its style features (e.g., position, width, height, background, image, and the like). In an implementation, an initial mutation insert event includes a full tree of elements of a first screen. Subsequently, there will be same event types with portions of the screen to be replayed in a specific position of the screen.

The following is an example of a mutation insert:

```
{
"type": 1,
"timestampMs": 1603197474255,
"parentId": -2066894611758410200,
"indexInParent": 23,
"view":
{
"metadata": {
},
"id": "_UIScrollViewScrollIndicator_589741209",
"style": {
"alpha": 0,
"x": 0,
"height": 0,
"y": 64,
"bmp": <a bitmap hash>,
"bmpHash": <the key identifying the hash>
"clipChildren": false,
"width": 0,
"bg": "#00000000",
"cornerRadius": 0,
"blur": false,
"visibility": true },
"recordingId": -1234507227332606500,
"children": [ {
"metadata": { },
"id":
"UIView_279702121",
"style": {
"alpha": 1,
"x": 0,
"height": 0,
"y": 64,
"clipChildren": false,
"width": 0,
"bg": "#7FFFFFFF",
"cornerRadius": 0,
"blur": false,
"visibility": true
},
```

```
"recordingId": -1234570784047969000,
"children": [ ],
"format": 1
}
],
"format": 1
}
},
```

Figure 4:
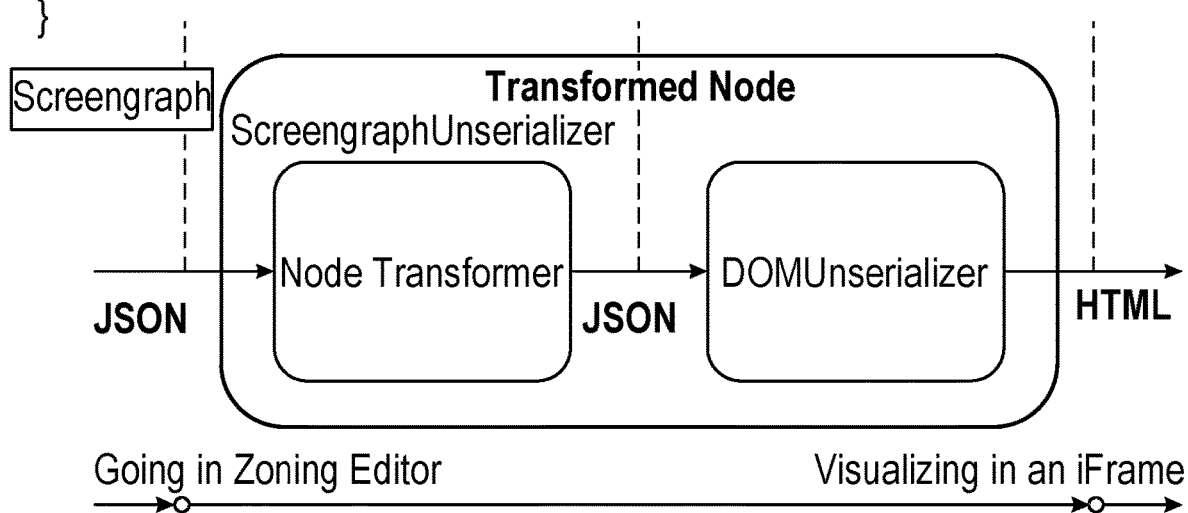
FIG. 4 illustrates an example of a transformation 402 of an element(s) in accordance with embodiments of the subject technology.
Figure 5:
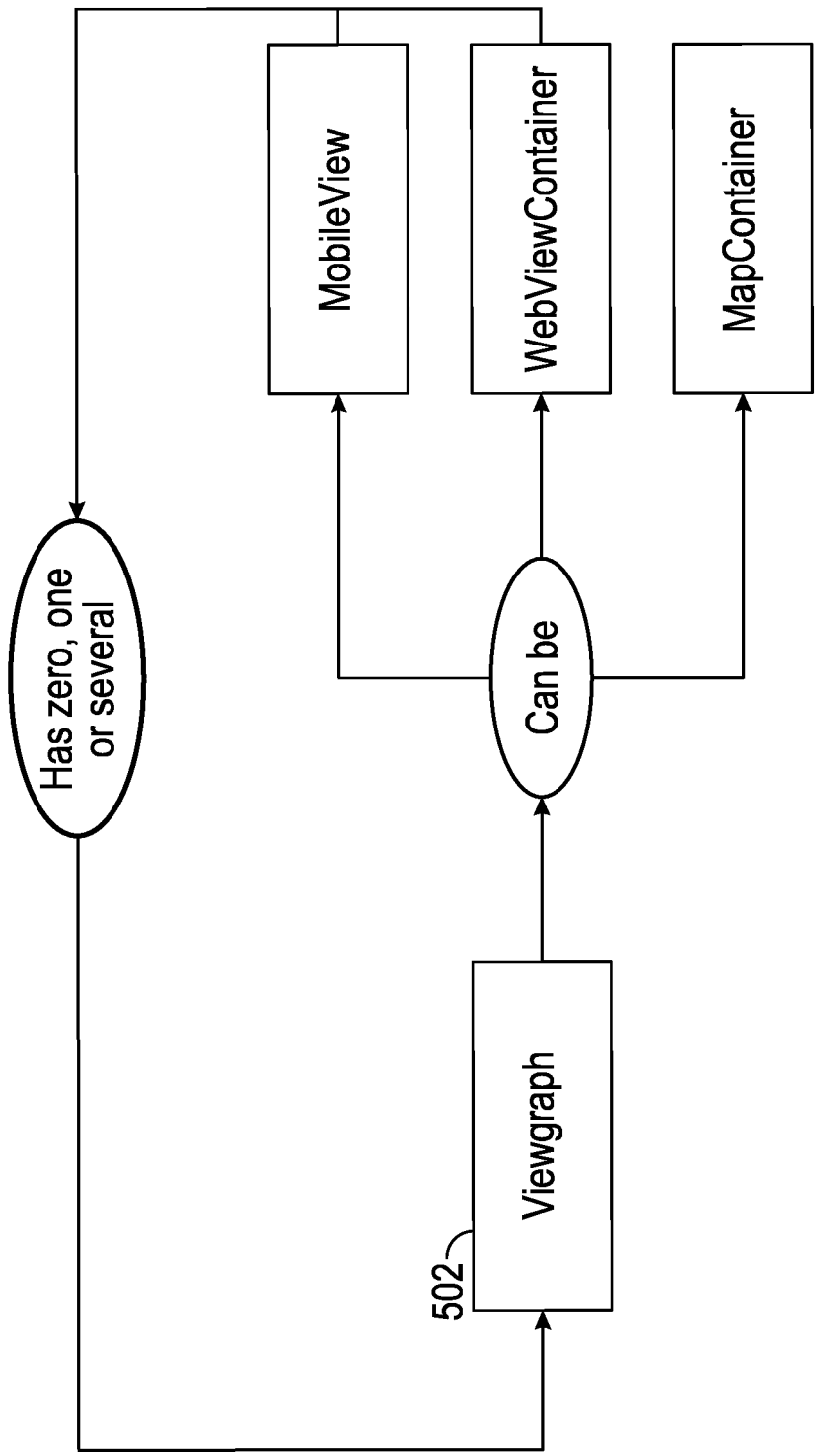
FIG. 5 illustrates an example of a viewgraph as part (e.g., the child) of another viewgraph in accordance with embodiments of the subject technology.

FIG. 4 illustrates an example of a transformation 402 of an element(s) in accordance with embodiments of the subject technology. Such a transformation(s) and related operations can be implemented by a set of components that is referred to, collectively, as a data transformation pipeline (DT pipeline or simply "DT").

In the example of FIG. 4, having the style features of each element of a screen is important since each element can be displayed accordingly in a session replay. In an implementation, when the session player is executed, the elements are required to be replayed as HTML elements in an inline frame (iframe), which necessitates a transformation of such elements to HTML elements which is illustrated in FIG. 4.

As mentioned herein, the term "screengraph" or "screen graph" refers to a data structure with a set of nodes, and includes a full description of a screen on the session replay SDK side that undergoes transformation for including in a session replay. In the session replay, the screengraph will be the initial event of a mutation insert representing the full screen at the beginning of the session.

Further, common or subsequent mutation insert events (e.g., not the initial mutation insert event) are fragments of screengraphs. Each fragment of a screengraph is unserialized (e.g., using a screengraph unserializer component referred to herein as an "unserializer") and transformed as HTML elements with CSS representing their styles. For those fragments, the transformation needs to know where to place the fragments in a DOM representing the screen during the replay.

The following discussion continues the examples of events.

When a fragment of a screen is received, it is required to know where to perform an insertion in the DOM. In an implementation, in the same event as a mutation insert, a parentId attribute (parent identifier) and an indexInParent attribute (index in the parent) are included at the same level of a viewgraph. As mentioned here, a "viewgraph" or "view graph" refers to a portion or fragment of a screengraph.

In an implementation, a recordingId attribute (e.g., recording identifier) is associated to each element of the viewgraph and its children. Each element that will be unserialized and replayed in the DOM are stored in a dictionary data structure and indexed by their own recordingId.

When a new viewgraph is received, if there is a parentId along with this one, this parentId will match a previously stored and replayed HTML element from a previous mutation insert event. The new viewgraph that is received will have to be appended to the parent element matching this parentId. With the dictionary mentioned before, the parent HTML element matching the right parentId can be found, and by using the DOM API's methods for appending such as appendChild( ) to this parent, the new HTML element from the new viewgraph is placed under the parent one. In an example, it will be inserted at the first position under the parent, but if an indexInParent along with the parentId are specified, it is known at which position under the parent where to insert the new HTML element.

At this stage, all mutation insert events can be replayed as HTML elements that are appended sequentially, at the right position, in an iframe with the correct timestamps.

The resulting event that is compatible with the session player is provided in the following:

```
{
type: 1,
date: 168787328983,
args: [node, viewSize, parentId, indedxInParent]
}
```

Mutation Removal

Another type of event that can be received from the session replay SDK removes a current viewgraph during the session replay. The following is an example of a mutation removal:

```
{ "type": 2,
"timestampMs": 1603197474318,
"recordingId": -1234507227332606500
},
```

In an implementation, to perform the mutation removal, the recordingId of the viewgraph that was inserted earlier during the replay is required.

In an example, using a dictionary data structure mentioned before, it is possible to receive the HTML element previously generated by the unserialization of a viewgraph sent by a mutation insert. This HTML element is the one present in the iframe during the rendering, so by calling a method remove( ) on this node from the DOM API, we can easily remove it from the replay frame.

Mutation Style

A mutation style is a type of event includes the recordingId of a current viewgraph in the replay frame and the style to modify, which is represented in the following example:

```
{
"type": 3,
"timestampMs": 1603197494371,
"recordingId": 1234579321937029000,
"styleChanges":
{
"y": 460
}
},
```

When receiving this event, a transformation of the style can be performed by generating a string that will be the CSS to assign to the current HTML element representing the viewgraph. In an example, the CSS text is the value of the "style" attribute before on the schema of unserialization.

Mutation Move

A mutation move is an event is to simulate the fact that a current existing view/node has moved in the structure of the screen, which is represented in the following example:

```
{
"type": 6,
"timestampMs": 1603197494371,
"recordingId": 1234579321937029000,
```

```
"parentId": 93762947493272947777,
"indexInParent": 4
},
```

This type of event is "lighter" in terms of data consumption on the SDK side and avoids sending an insert after a removal that could be too consuming. The recordingId is the ID of the node that is to be moved. The parentId and indexInParent are respectively the new parent and position under parent of the node to move.

Touch Event

A touch is an event that is sent to display the gestures of the users that are collected on the SDK side to see where the user tapped/swiped during the replay. The format of this event is as follows:

```
{
"type": 4,
"touchTimestampsMs": [1603197494371, 1603197494372,
1603197494373, 1603197494374]
"x": [0, 5, 10, 15],
"y": [10, 15, 20, 25],
},
```

The touchTimestampsMs are the moments matching each coordinates of the finger sent as arrays of x and y.

On the session player side (or experience analytics server 116), a specific transformation of this event is performed to create as much events as there are coordinates. In the previous example, four events are created from the event sent by the session replay SDK). Each event will be played at the given timestamp in the touchTimestampMs array.

Resize Event

A resize event is used to illustrate a change of orientation of the device during a session, which is shown in the following example:

```
{
"type": 9,
"timestampMs": 1603197494371,
"width": 1920,
"height": 1080,
},
```

Figure 10:
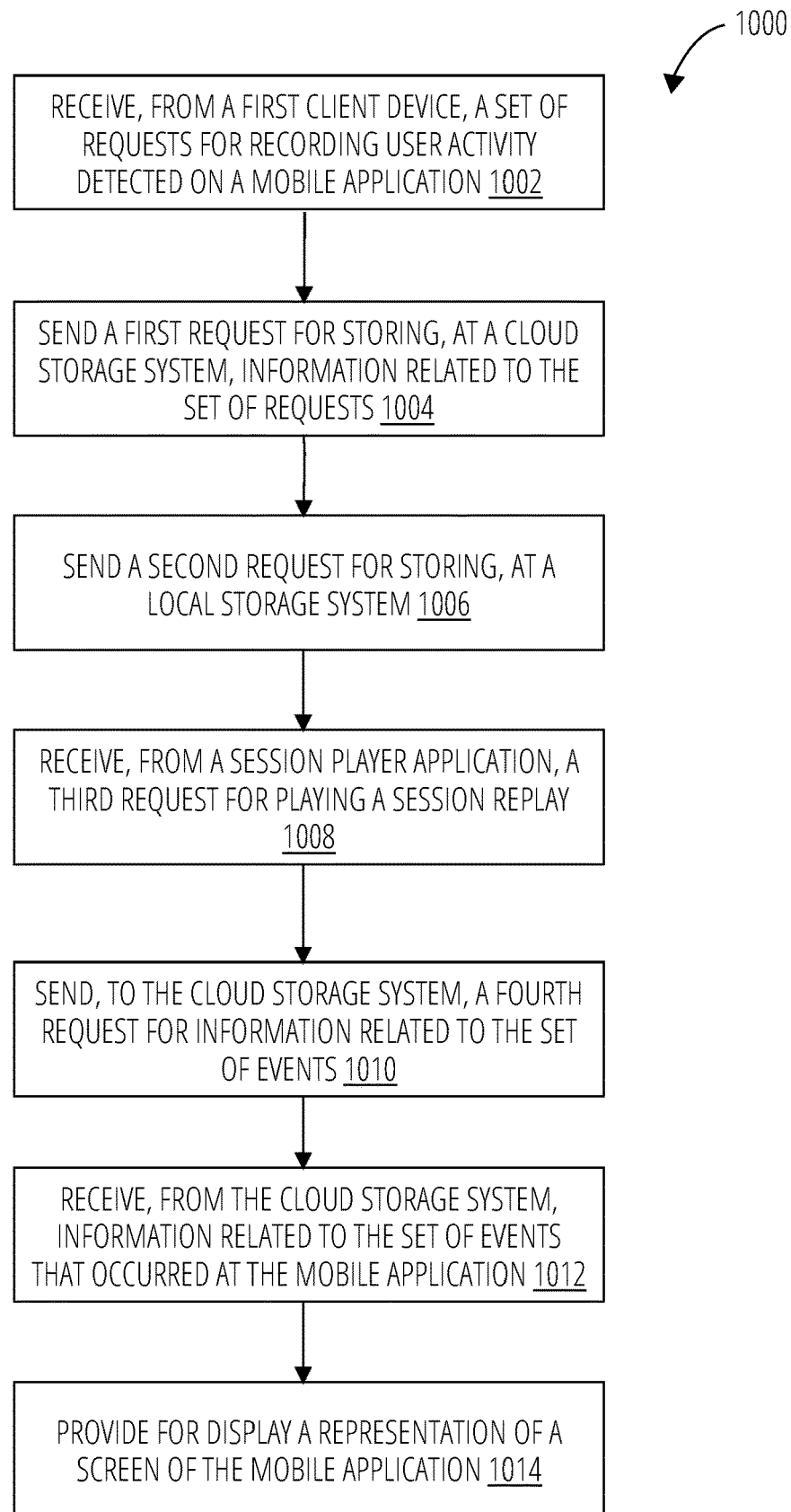
FIG. 10 is a flowchart for a process, in accordance with some examples.

When receiving the above information, the containers of a window (e.g., an interface area showing a viewport as shown in FIG. 10) showing the session replay are resized accordingly.

Mobile Views

Mobile views are unserialized recursively until the leaves of the screengraph are reached.

Each child of a mobile view is a viewgraph, as described above.

For each mobile view node of the graph:
Its text is turned into an HTML text node wrapped in a DIV
Its background image is cached and set in the background CSS property of the resulting node
The unserializer detects if the node should be displayed as a flat placeholder (e.g., Flat background color+single placeholder text node inside)
The HTML embedded directly in the node is just pasted as the content of an iframe.

WebView Containers

WebView containers' content is unserialized like mobile views and then set as the content of an iframe element.

The session replay SDK optionally provides the number of lines the given WebView container must span. If this number is 0, the resulting iframe will just fit its content.

If the WebView container is empty, a placeholder element is put in place.

The following is an example of input for a WebView container:

```
{ "id": "webView",
"style": {
"height": 640,
"width": 1080,
"x": 0,
"y": 376,
"bg": "#00FFFFFF",
"alpha": 1,
"visibility": true },
"format": 2,
"metadata": {
"class_name": "WebView",
"fullpath": "[root]>LinearLayout:eq(0)>FrameLayout:eq(1)
>FitWindowsLinearLayout:eq(0)#action_bar_root>ContentFrameLayout:eq
(1) #content>ConstraintLayout:eq(0)>RelativeLayout:eq(1)
#fragment_container>ConstraintLayout:eq(0)#webViewContainer>WebView
:eq (1)#webView"
}, "children": [
{
"nodeType": 9,
"baseURI": "hello.com",
"format": 1,
"children": [
{ "children": [ ],
"format": 0,
"localName":
"div", "namespaceURI": "http://www.w123ABC.org/1999/xhtml",
"nodeType": 1, "tagName": "DIV"
}
]
}
]
}
```

The following is an example of output for a WebView container:

```
{
"attributes": [
{ "name": "data-id",
"namespaceURI": "",
"value": "webView"
},
{ "name": "fullpath",
"namespaceURI": "", "value":
"[root]>LinearLayout:eq(0)>FrameLayout:eq(1)
>FitWindowsLinearLayout:eq(0)#action_bar_root>ContentFrameLayout:eq
(1) #content>ConstraintLayout:eq(0)>RelativeLayout:eq(1)
#fragment_container>ConstraintLayout:eq(0)#webViewContainer>WebView
:eq (1)#webView" },
{ "name": "class",
"namespaceURI": "",
"value": "WebView"
},
{ "name": "style",
"namespaceURI": "",
"value": "position: fixed;display: flex;align-items: center;
opacity: 1;top: 376px;left: 0px;width: 1080px;height: 640px;clip:
rect (auto, auto, auto, auto);"
}
],
```

```
"children": [ ],
"contentDocument": {
"nodeType": 9,
"baseURI": "hello.com",
"format": 1,
"children": [
{ "children": [ ],
"format": 0,
"localName": "div",
"namespaceURI": "http://www.w123ABC.org/1999/xhtml",
"nodeType": 1,
"tagName": "DIV"
}
]
},
"format": 0,
"localName": "iframe",
"namespaceURI": "http://www.w123ABC.org/1999/xhtml",
"nodeType": 1,
"tagName": "IFRAME"
}
```

Style

The tables below map the properties of the object of the field screengraph.style to the CSS properties used to render the same effect in the session player. In some instances, the term "property" can also refer to an "attribute" or "field" as mentioned elsewhere herein, where each of the aforementioned terms may be used in a synonymous manner with each other term.

Position and Shape

| Input screengraph style property | Output CSS property |
|---|---|
| x (absolute) | left |
| y (absolute) | top |
| width | width |
| height | height |

Visibility

| Input screengraph style property | Output CSS property |
|---|---|
| alpha | opacity |
| clipChildren | clip + CSS function rect( ) |
| visibility | display |

Text

The object of the field screengraph.style.textInfos.

| Input screengraph style property | Output CSS property |
|---|---|
| textInfos.alignment | text-align |
| textInfos.color | color |
| textInfos.size | font-size |
| contentOffsetX | margin-left |
| contentOffsetY | margin-top |

Other Style Properties

| Input screengraph style property | Output CSS property |
|---|---|
| bg | background-size background-color |
| cornerRadius | border-radius |
| placeholder | display overflow background color border (or border-top for keyboard placeholders) align-items justify-content font-family font-size |
| shadow | box-shadow |

Image Handling

The following describes operations for processing images:
  Each image is sent once by the session replay SDK, along with its related hash.
  The hash is always provided.
  The unserializer caches images when images are provided.
    For each viewgraph, the first thing that is done when processing its style is checking if it describes an image. That is, if it includes the field style.bmpHash.
    If it does, the unserializer looks for the field style.bmp. If it exists, the bitmap is added to the cache
  When an image hash is found in the screengraph without its related image, then the unserializer deduces that it was already provided earlier and retrieves it from its cache.
  Usually, when the unserializer fails to retrieve an image from its cache with a given hash, then it means that there was a problem is the order the events were sent by the session replay SDK.
  Exception: When the value of the given node's field style.bmpHash is a "placeholder", the unserializer does not try to cache and just displays a text node as a placeholder.
  The following relates to style for images:

| Input screengraph style property | Output CSS property |
|---|---|
| bmp | background-size background-image: url( ) |

The following discussion relates to a cache for images.

A session, as referred to herein, is a stream of events whose each event includes a viewgraph that can either describe a whole page (e.g. when opening the app or changing screen), or a just part of a page that was already displayed previously and that has been transformed.

In an implementation, a cache for images is a map, which is a member of the session replay viewgraph transformer class.

For a session replay that include images to work properly, the session replay uses only one same instance of the unserializer for the whole session (stream of events).

The following discussion relates to a static resources manager. A static resources manager enables removal of images from payloads by retrieving the images through references in a storage device (e.g., cloud storage device or system), which would lower an amount of data to be process and forgo operations related to image caching as described above.

Figure 6:
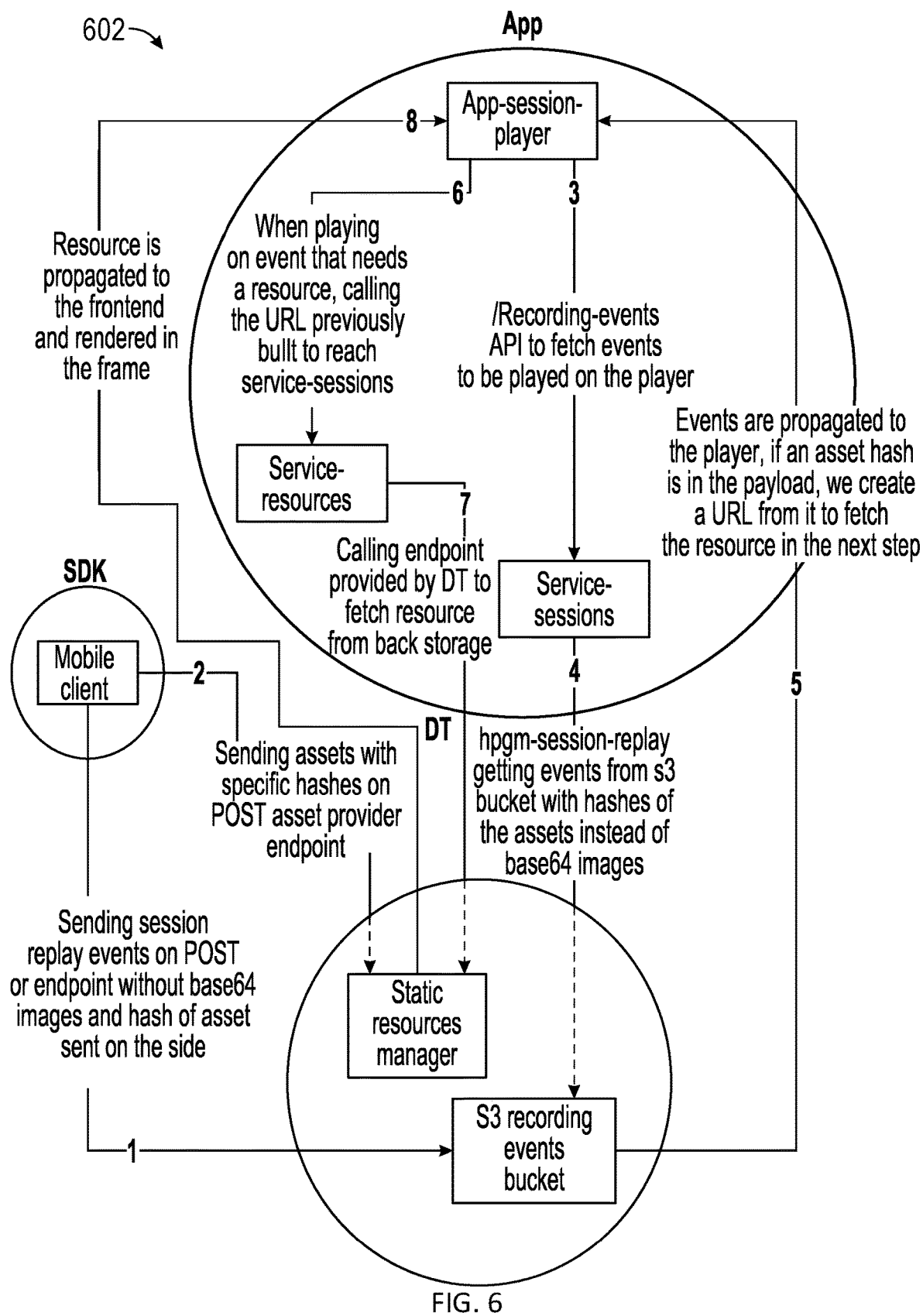
FIG. 6 illustrates an example of a system architecture in accordance with embodiments of the subject technology.

FIG. 6 illustrates an example of a system architecture 602 in accordance with embodiments of the subject technology.

The following discussion relates to aspects of the system architecture 602.

In an implementation, the session replay SDK (e.g., shown as including mobile client in FIG. 6) sends assets directly in the payload of the session replay events, which can be represented by the following:

https://hpgm123ABC.io/session-replay/v1/projects/1923/getPayloadsForPageview?&userIdHashed=1234509107786528310&pageNumber=7&sessionNumber=21

In an implementation, the images are base 64 data that are being interpreted during the event transformation as a background-image: url("data:image/bmp;base64,<base64>") CSS property. However, in some instances, this is not good in terms of performance on the data collection side because a same base64 image is re-sent for each new session.

To improve performance, reduce storage or memory utilization, and reduce network utilization, the following can be provided in some embodiments:

Session Replay SDK:
1. Assets are sent to another endpoint designated by the DT pipeline and not in the payload of events
2. In the event payload, the session replay SDK sends only an hash for the asset that will allow fetching this asset by the session player DT:
1. Provide another endpoint for receiving assets, which are to be sent by session replay SDK Session Replay System/Session Player:
1. From the hash received from the SDK payload, construct the URL that will reach our backend servers that will fetch from a DT API provided the resource persisted by the session replay SDK and render it in a frame for display in the session player
2. The mechanism uses logic as provided by the Web when it comes to call a micro-service (discussed further herein) to contact the DT API and fetch the resources The following relegates to an implementation of the system architecture 602.

Transforming the Hash of an Asset into a Micro-Service URL

For a current style object in each viewgraph node, the session replay SDK sends a hash corresponding to the hash of an asset that is rendered in the session replay. In an example, the following can represent such a hash:

```
{
format: 0,
recordingId: 123454928409284,
...
style: {
...
bmpHash: '<the hash of the resource to fetch>',
...
}
}
```

As seen above, a field called bmpHash is used as an image hash to fetch the corresponding asset in the memory cache.

In an embodiment, this hash is processed to generate a URL that will be used to fetch this asset for the session player. The URL can have the following format:

/assets?pid=4567&r=cs://<the hash of the resource>

This format matches the URL of the proxy used by a session player application in FIG. 6 that redirects the request to a micro-service that will fetch the data in the blob storage (e.g., cloud storage, and the like) provided by DT through an API that DT provides for the static resources manager.

In an implementation, the following is performed to transform the URL:

- transform the viewgraph nodes having bmpHash attribute into <img> with a src attribute containing cs://${bmpHash} needed to fetch the resource.
- in the session player, use a NodeTransformer component (e.g., in FIG. 4) at the initialization of a DOMUnserializer component (e.g., also in FIG. 4)
- the role of this NodeTransformer is, during unserialization, to transform all src attributes in the serialized DOM
- a URL transformer that utilizes the value of the src attribute and transforms as:
- /assets? pid=4567&r=cs://${bmpHash}

Getting the Resource from the DT Static Resource Manager Using the Micro-Service In the session player application in FIG. 6, a URL is generated that will be called during the replay targeting the micro-service mentioned above: /assets? pid=4567&r=cs://${bmpHash}

In an implementation, a switch mechanism is provided in the backend to check the domain of the resource URL (the r query parameter) and see if it is a specific domain (cs://).

The position of an element in the screen can be expressed in two different ways: using relative or absolute positioning.

Figure 7:
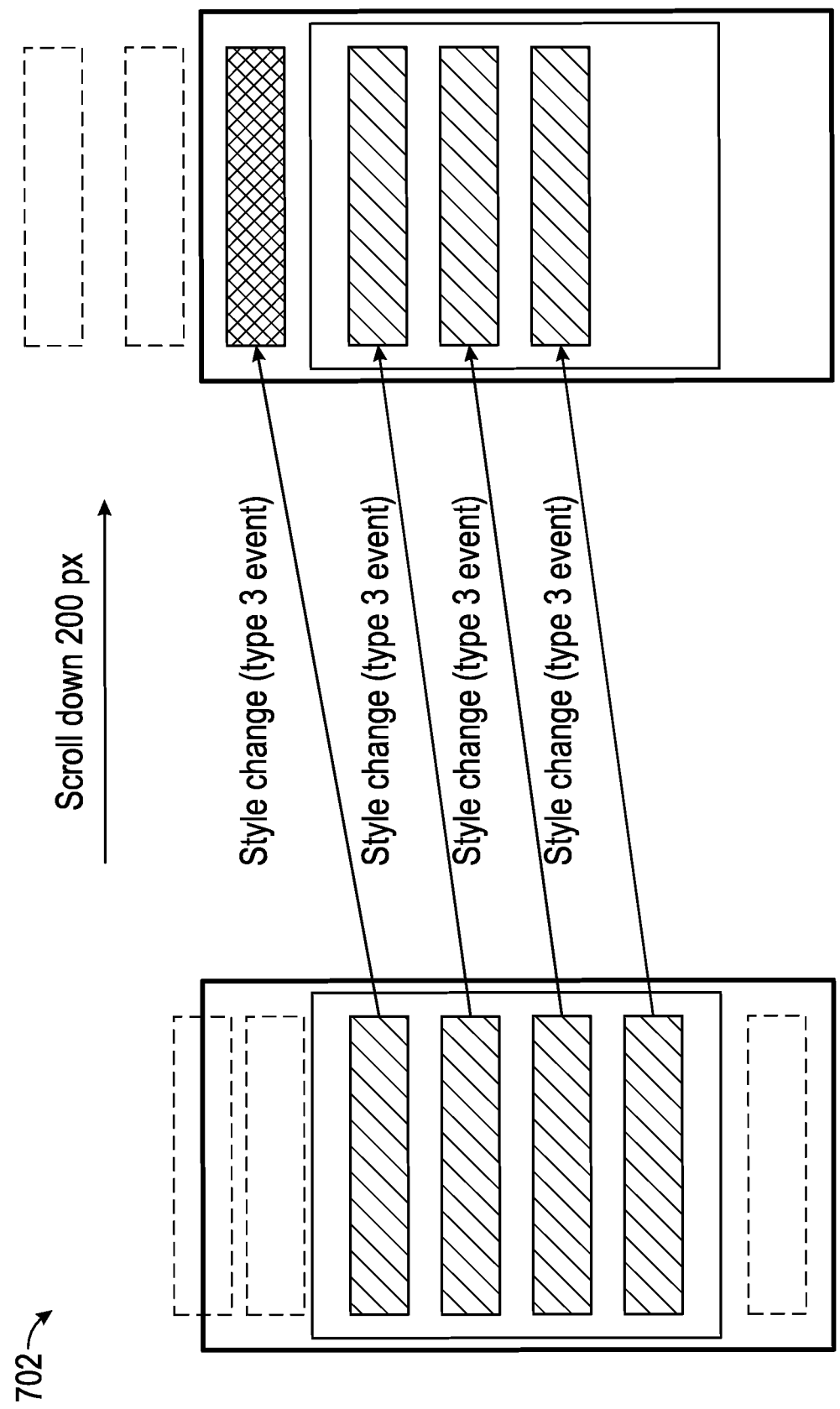
FIG. 7 illustrates an example of scrolling with absolute positioning in accordance with some embodiments of the subject technology.

FIG. 7 illustrates an example 702 of scrolling with absolute positioning in accordance with some embodiments of the subject technology.

In an example, using relative positioning the SDK sends the position of each element relative to the parent. Using absolute positioning the SDK sends the position relative to the viewport. An advantage with relative positioning is that the number of events to send for specific scenarios is greatly reduced, for example during a page scroll.

Relative positioning: express the position of an element relative to the parent

Absolute position: express the position of an element relative to the viewport

The main benefit is related to how to handle a page scroll. Using relative position, scrolling a view can be represented with a single event. With absolute position, it is necessary to resend the position of all the elements every time they move.

Relative vs Absolute Position

Changing from absolute to relative positioning does not involve a lot of changes in how the elements are rendered in the session player. The behavior of position: absolute is similar to position: relative. In particular, an only change needed when switching from absolute to relative position is changing the position of the element as follows:

from position: fixed to position: absolute

A position: fixed element is positioned relative to the viewport, or the browser window itself.

A position: absolute element is positioned relative to the window or first parent with position: absolute or position: relative.

A relevant difference between the two position systems discussed above is how to handle scrolling.

Scroll with Absolute Positioning

With absolute positioning, each time the page is scrolled, the session replay SDK sends an event for each element that has moved. For example, a list with 4 elements would require resending the position of every element.

Figure 8:
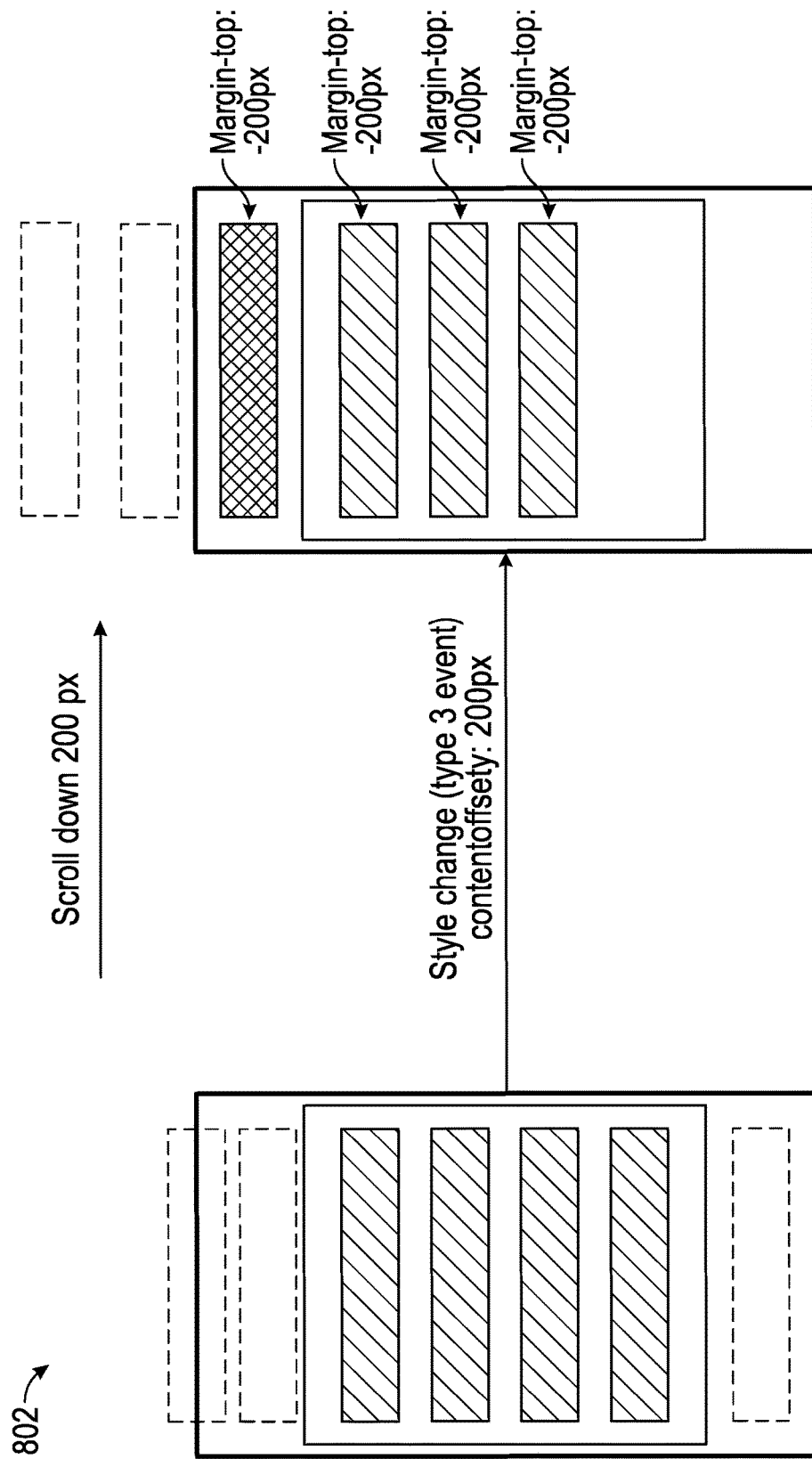
FIG. 8 illustrates example of scrolling with relative positioning in accordance with some embodiments of the subject technology.

FIG. 8 illustrates example 802 of scrolling with relative positioning in accordance with some embodiments of the subject technology.

Scroll with Relative Positioning (Content-Offset)

With relative position, elements inside a scrolling container are moving all by the same amount, and a scroll can be represented as a single event on the scroll container. In order to express that an element is scrolling, a content-offset property is received on the scroll container.

By doing this, one event can be sent to playback the scroll at the session player, and thereby greatly reduce the number of events.

In an implementation, handling a scroll with relative position requires data manipulation, in particular, depending on the event type:

Type 1 (insert): While transforming the event nodes are recursively searched for that have a contentOffset property. If a node is found with such property, it is assumed that this is a scroll container and the following is performed:
Applying the content-offset (margin) to all its children
Removing the content offset from the node
Type 3 (property mutation): if the property mutation includes a contentOffset then the content-offset (expressed as margin) is applied to all the children and the contentOffset is removed from the parent Switching Between Relative and Absolute Position In an implementation, a flag (e.g., attribute or indicator) is utilized to determine if the position being received from the session replay SDK is relative or absolute.

Figure 9:
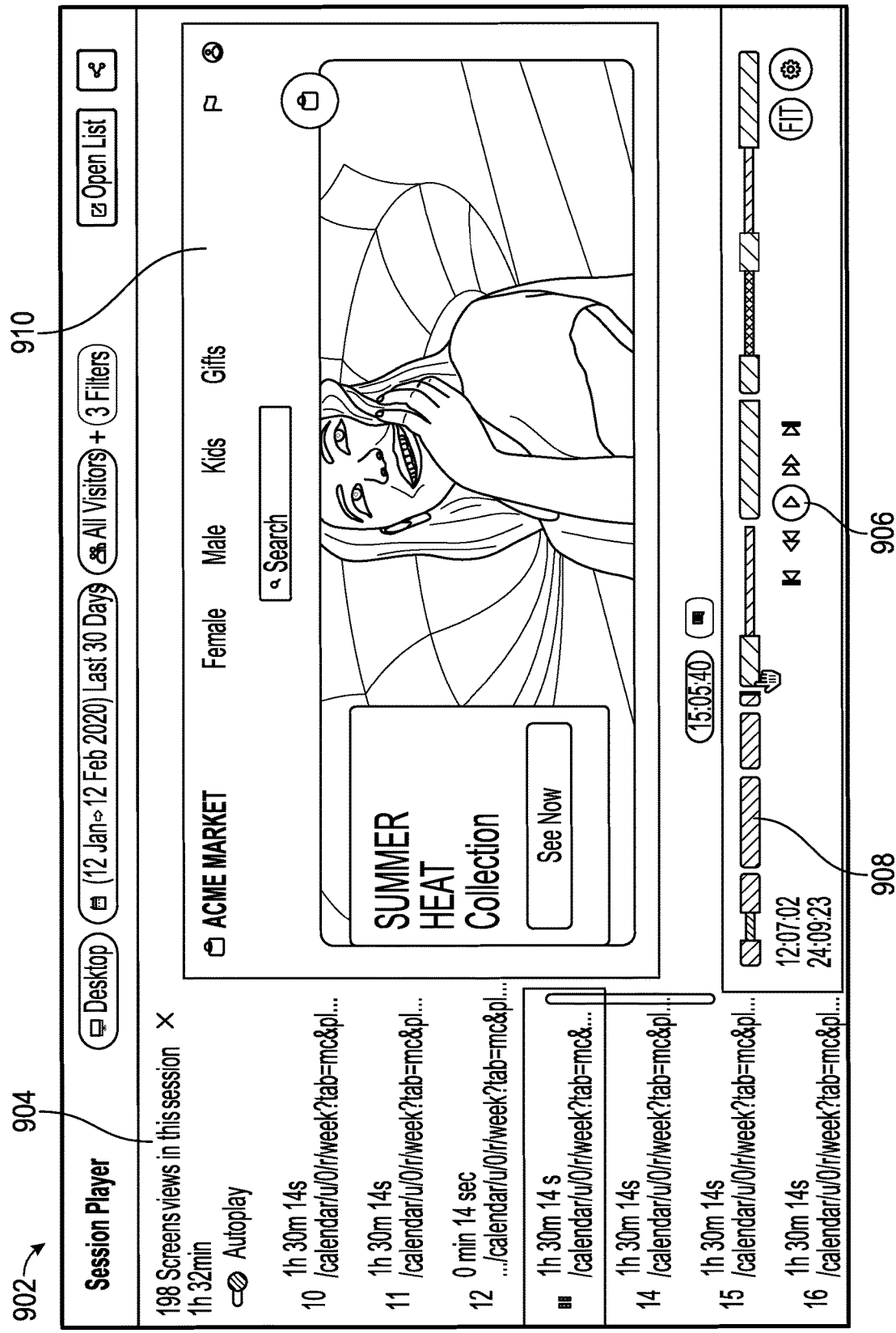
FIG. 9 is an example user interface of a session player that facilitates playback of a user session for display on a client device, in accordance with some embodiments of the subject technology

FIG. 9 is an example user interface 902 of a session player (which is provided by session replay system 208) that facilitates playback of a user session for display on a client device (e.g., experience analytics client 104), in accordance with some embodiments of the subject technology.

As illustrated, user interface 902 includes interface area 904 that includes a listing of screens, each including a name of a corresponding screen, from a session. When a screen is played during session playback, the corresponding screen in the listing will be highlighted in interface area 904. The session playback can be paused by selecting a graphical item (e.g., the pause button) from interface area 906. In particular, interface area 906 includes a set of playback controls (e.g., play, pause, fast forward, fast reverse, skip forward, skip backward, and the like).

As further shown, interface area 910 represents a viewport of the currently playing (or selected) screen from the user's session.

As also shown, interface area 908 includes a selectable representation of a timeline corresponding to the session playback which can include graphical indicators of the events shown in interface area 908.

Process

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

FIG. 10 is a schematic diagram illustrating a process 1000, in accordance with embodiments of the subject technology.

In block 1002, experience analytics server 116 receives, from a first client device, a set of requests for recording user activity detected on a mobile application. In block 1004, experience analytics server 116 sends a first request for storing, at a cloud storage system, information related to the set of requests. In block 1006, experience analytics server 116 sends a second request for storing, at a local storage system. In block 1008, experience analytics server 116 receives, from a session player application, a third request for playing a session replay. In block 1010, experience analytics server 116 sends, to the cloud storage system, a fourth request for information related to the set of events. In block 1012, experience analytics server 116 receives, from the cloud storage system, information related to the set of events that occurred at the mobile application. In block 1014, experience analytics server 116 provides for display a representation of a screen of the mobile application.

Figure 11:
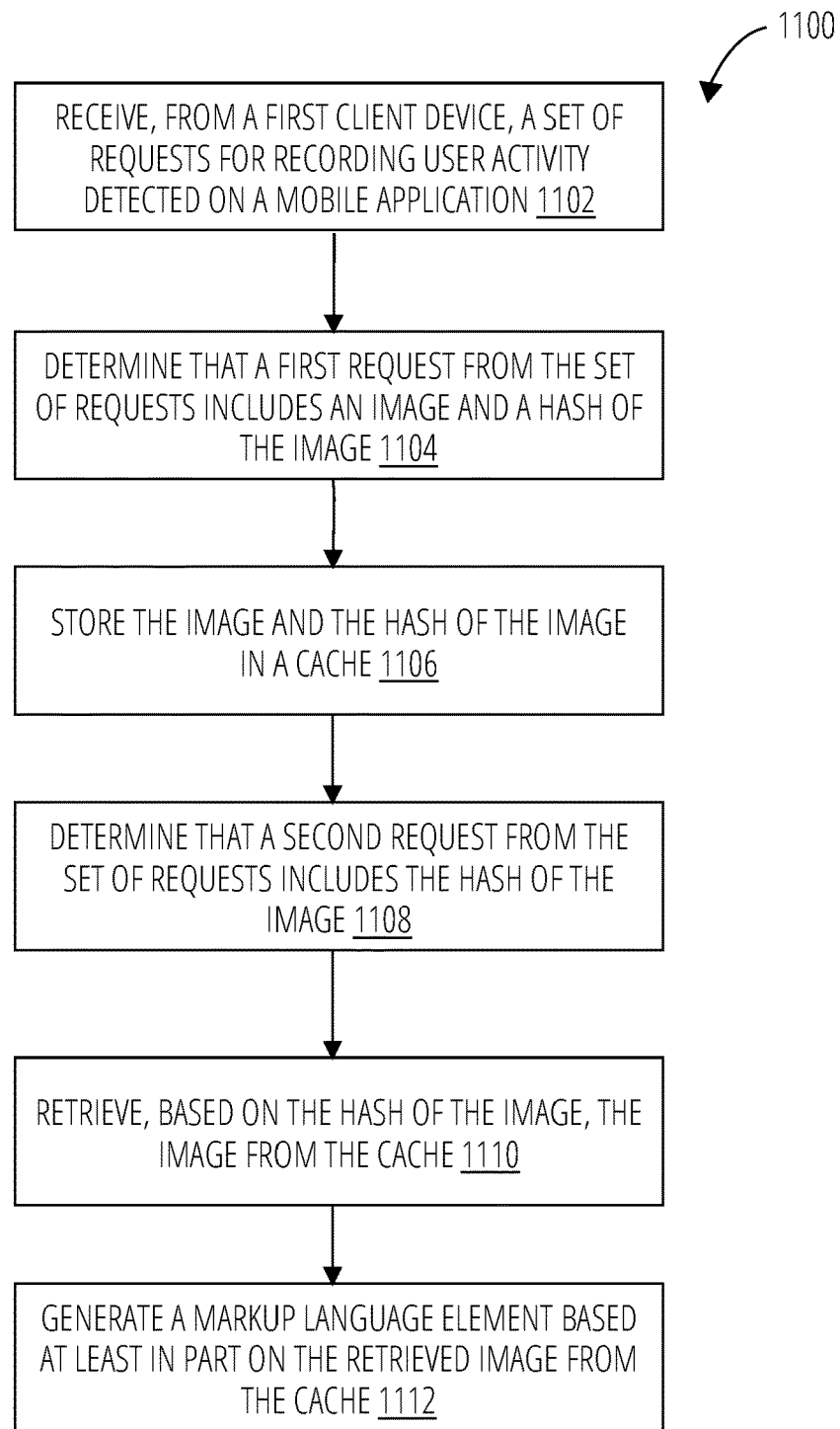
FIG. 11 is a flowchart for a process, in accordance with some examples.

FIG. 11 is a schematic diagram illustrating a process 1100, in accordance with embodiments of the subject technology.

In block 1102, experience analytics server 116 receives, from a first client device, a set of requests for recording user activity detected on a mobile application. In block 1104, experience analytics server 116 determines that a first request from the set of requests includes an image and a hash of the image. In block 1106, experience analytics server 116 stores the image and the hash of the image in a cache. In block 1108, experience analytics server 116 determines that a second request from the set of requests includes the hash of the image. In block 1110, experience analytics server 116 retrieves, based on the hash of the image, the image from the cache. In block 1112, experience analytics server 116 generates a markup language element based at least in part on the retrieved image from the cache.

Figure 12:
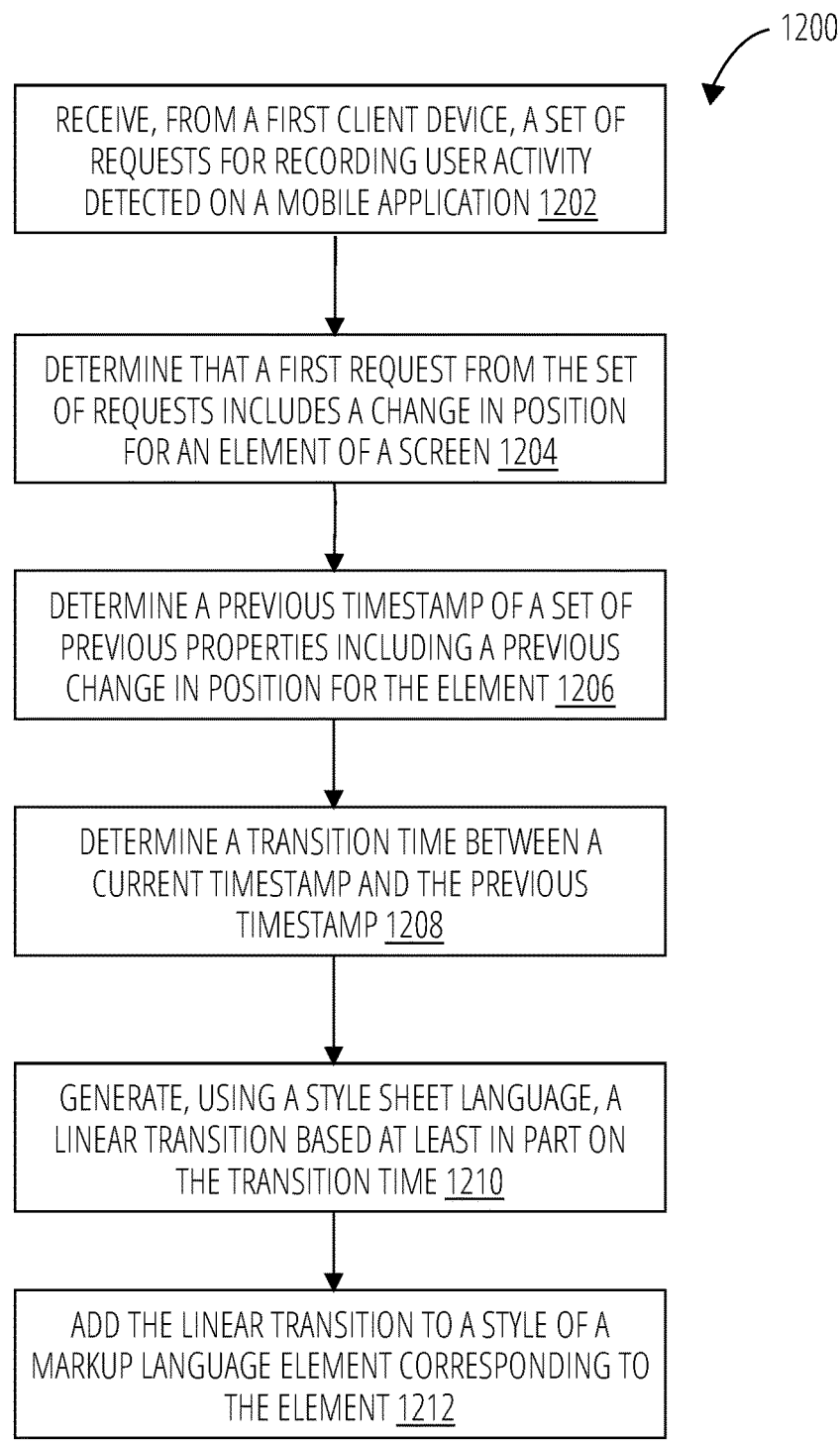
FIG. 12 is a flowchart for a process, in accordance with some examples.

FIG. 12 is a schematic diagram illustrating a process 1200, in accordance with embodiments of the subject technology.

In block 1202, experience analytics server 116 receives, from a first client device, a set of requests for recording user activity detected on a mobile application. In block 1204, experience analytics server 116 determines that a first request from the set of requests includes a change in position for an element of a screen. In block 1206, experience analytics server 116 determines a previous timestamp of a set of previous properties including a previous change in position for the element. In block 1208, experience analytics server 116 determines a transition time between a current timestamp and the previous timestamp. In block 1210, experience analytics server 116 generates, using a style sheet language, a linear transition based at least in part on the transition time. In block 1212, experience analytics server 116 adds the linear transition to a style of a markup language element corresponding to the element.

Figure 13:
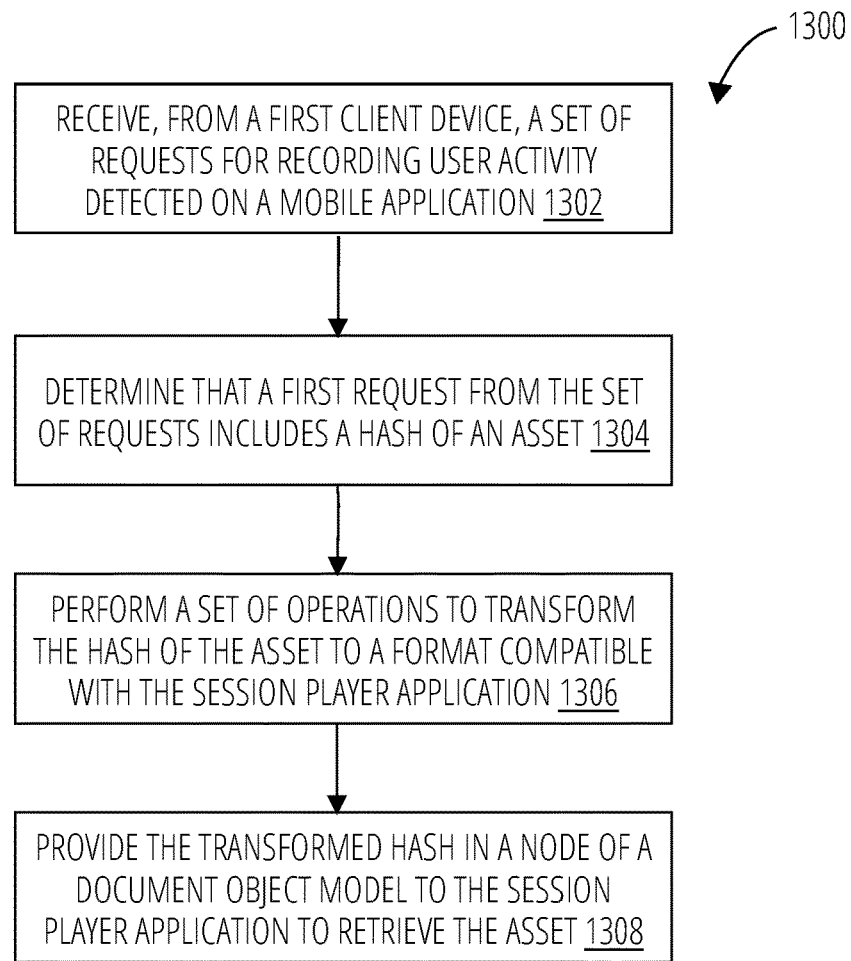
FIG. 13 is a flowchart for a process, in accordance with some examples.

FIG. 13 is a schematic diagram illustrating a process 1300, in accordance with embodiments of the subject technology.

In block 1302, experience analytics server 116 receives, from a first client device, a set of requests for recording user activity detected on a mobile application. In block 1304, experience analytics server 116 determines that a first request from the set of requests includes a hash of an asset. In block 1306, experience analytics server 116 performs a set of operations to transform the hash of the asset to a format compatible with the session player application. In block 1308, experience analytics server 116 provides the transformed hash in a node of a document object model to the session player application to retrieve the asset.

Machine Architecture

Figure 14:
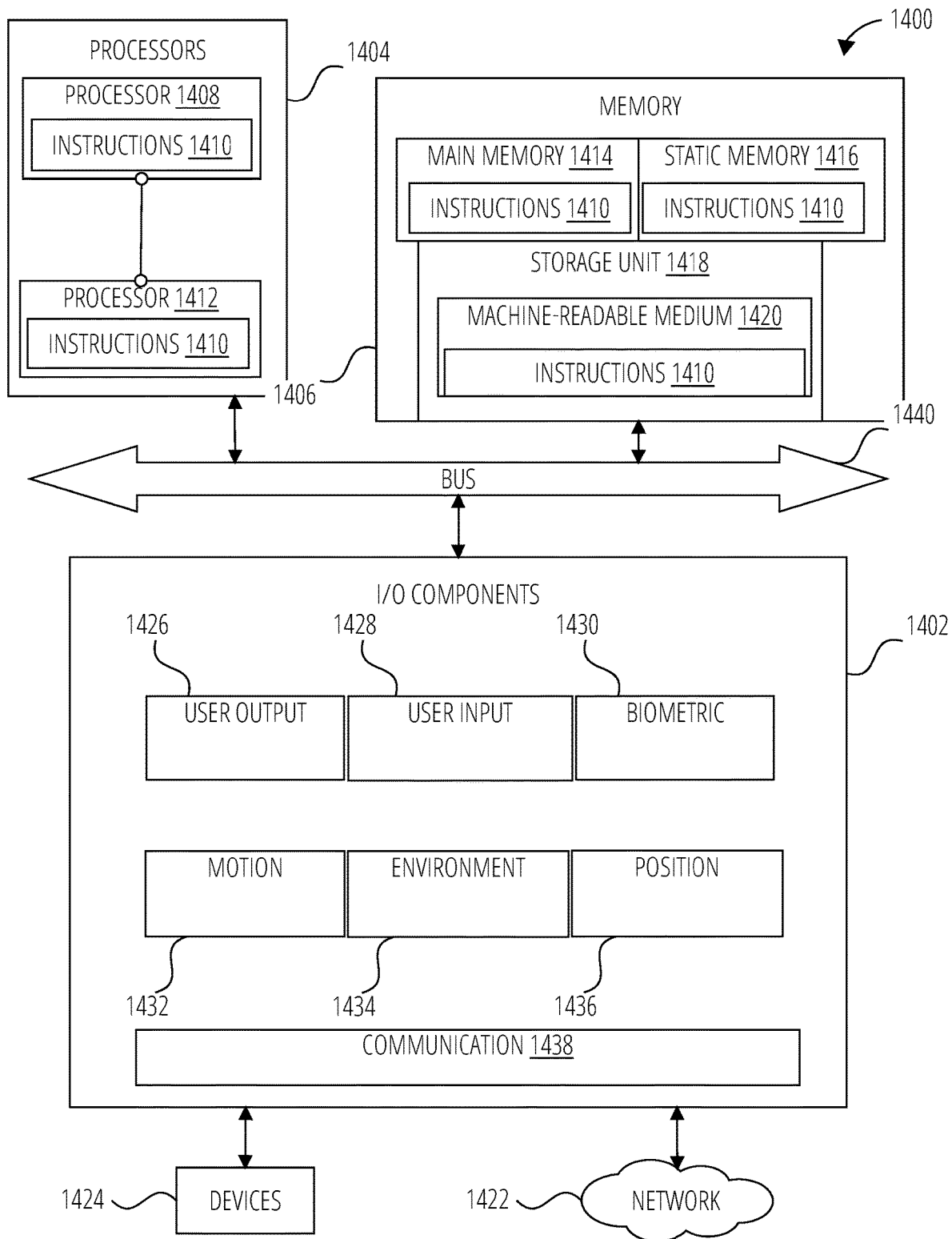
FIG. 14 is a diagrammatic representation of a machine in the form of a computer system within which a set of instructions may be executed for causing the machine to perform any one or more of the methodologies discussed herein, in accordance with some examples.

FIG. 14 is a diagrammatic representation of the machine 1400 within which instructions 1410 (e.g., software, a program, an application, an applet, an application, or other executable code) for causing the machine 1400 to perform any one or more of the methodologies discussed herein may be executed. For example, the instructions 1410 may cause the machine 1400 to execute any one or more of the methods described herein. The instructions 1410 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1410, sequentially or otherwise, that specify actions to be taken by the machine 1400. Further, while only a single machine 1400 is illustrated, the term "machine" shall also be taken to include a collection of machines that individually or jointly execute the instructions 1410 to perform any one or more of the methodologies discussed herein. The machine 1400, for example, may comprise the member client device 102 or any one of a number of server devices forming part of the experience analytics server 116. In some examples, the machine 1400 may also comprise both client and server systems, with certain operations of a particular method or algorithm being performed on the server-side and with certain operations of the particular method or algorithm being performed on the client-side.

The machine 1400 may include processors 1404, memory 1406, and input/output I/O components 1402, which may be configured to communicate with each other via a bus 1440. In an example, the processors 1404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1408 and a processor 1412 that execute the instructions 1410. The term "processor" is intended to include multi-core processors that may comprise two or more independent processors (sometimes referred to as "cores") that may execute instructions contemporaneously. Although FIG. 14 shows multiple processors 1404, the machine 1400 may include a single processor with a single-core, a single processor with multiple cores (e.g., a multi-core processor), multiple processors with a single core, multiple processors with multiples cores, or any combination thereof.

The memory 1406 includes a main memory 1414, a static memory 1416, and a storage unit 1418, both accessible to the processors 1404 via the bus 1440. The main memory 1406, the static memory 1416, and storage unit 1418 store the instructions 1410 embodying any one or more of the methodologies or functions described herein. The instructions 1410 may also reside, completely or partially, within the main memory 1414, within the static memory 1416, within machine-readable medium 1420 within the storage unit 1418, within at least one of the processors 1404 (e.g., within the processor's cache memory), or any suitable combination thereof, during execution thereof by the machine 1400.

The I/O components 1402 may include a wide variety of components to receive input, provide output, produce output, transmit information, exchange information, capture measurements, and so on. The specific I/O components 1402 that are included in a particular machine will depend on the type of machine. For example, portable machines such as mobile phones may include a touch input device or other such input mechanisms, while a headless server machine will likely not include such a touch input device. It will be appreciated that the I/O components 1402 may include many other components that are not shown in FIG. 14. In various examples, the I/O components 1402 may include user output components 1426 and user input components 1428. The user output components 1426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1402 may include biometric components 1430, motion components 1432, environmental components 1434, or position components 1436, among a wide array of other components. For example, the biometric components 1430 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1432 include acceleration sensor components (e.g., accelerometer), gravitation sensor components, rotation sensor components (e.g., gyroscope).

The environmental components 1434 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 360° camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera and a depth sensor, for example.

The position components 1436 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1402 further include communication components 1438 operable to couple the machine 1400 to a network 1422 or devices 1424 via respective coupling or connections. For example, the communication components 1438 may include a network interface component or another suitable device to interface with the network 1422. In further examples, the communication components 1438 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1424 may be another machine or any of a wide variety of peripheral devices (e.g., a peripheral device coupled via a USB).

Moreover, the communication components 1438 may detect identifiers or include components operable to detect identifiers. For example, the communication components 1438 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1438, such as location via Internet Protocol (IP) geolocation, location via Wi-Fi® signal triangulation, location via detecting an NFC beacon signal that may indicate a particular location, and so forth.

The various memories (e.g., main memory 1414, static memory 1416, and memory of the processors 1404) and storage unit 1418 may store one or more sets of instructions and data structures (e.g., software) embodying or used by any one or more of the methodologies or functions described herein. These instructions (e.g., the instructions 1410), when executed by processors 1404, cause various operations to implement the disclosed examples.

The instructions 1410 may be transmitted or received over the network 1422, using a transmission medium, via a network interface device (e.g., a network interface component included in the communication components 1438) and using any one of several well-known transfer protocols (e.g., hypertext transfer protocol (HTTP)). Similarly, the instructions 1410 may be transmitted or received using a transmission medium via a coupling (e.g., a peer-to-peer coupling) to the devices 1424.

Software Architecture

Figure 15:
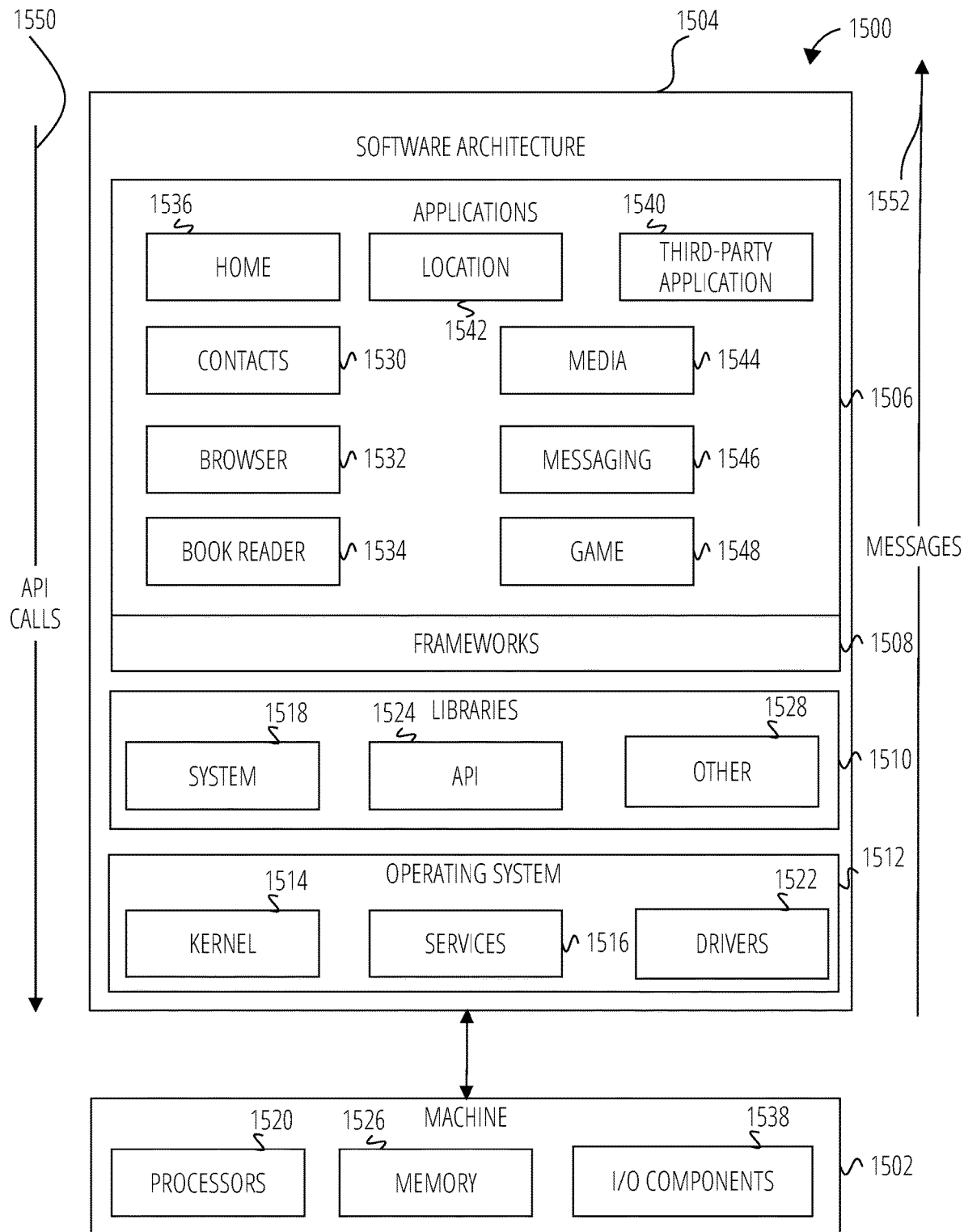
FIG. 15 is a block diagram showing a software architecture within which examples may be implemented.

FIG. 15 is a block diagram 1500 illustrating a software architecture 1504, which can be installed on any one or more of the devices described herein. The software architecture 1504 is supported by hardware such as a machine 1502 that includes processors 1520, memory 1526, and I/O components 1538. In this example, the software architecture 1504 can be conceptualized as a stack of layers, where each layer provides a particular functionality. The software architecture 1504 includes layers such as an operating system 1512, libraries 1510, frameworks 1508, and applications 1506. Operationally, the applications 1506 invoke API calls 1550 through the software stack and receive messages 1552 in response to the API calls 1550.

The operating system 1512 manages hardware resources and provides common services. The operating system 1512 includes, for example, a kernel 1514, services 1516, and drivers 1522. The kernel 1514 acts as an abstraction layer between the hardware and the other software layers. For example, the kernel 1514 provides memory management, processor management (e.g., scheduling), component management, networking, and security settings, among other functionality. The services 1516 can provide other common services for the other software layers. The drivers 1522 are responsible for controlling or interfacing with the underlying hardware. For instance, the drivers 1522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1510 provide a common low-level infrastructure used by the applications 1506. The libraries 1510 can include system libraries 1518 (e.g., C standard library) that provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1510 can also include a wide variety of other libraries 1528 to provide many other APIs to the applications 1506.

The frameworks 1508 provide a common high-level infrastructure that is used by the applications 1506. For example, the frameworks 1508 provide various graphical user interface (GUI) functions, high-level resource management, and high-level location services. The frameworks 1508 can provide a broad spectrum of other APIs that can be used by the applications 1506, some of which may be specific to a particular operating system or platform.

In an example, the applications 1506 may include a home application 1536, a contacts application 1530, a browser application 1532, a book reader application 1534, a location application 1542, a media application 1544, a messaging application 1546, a game application 1548, and a broad assortment of other applications such as a third-party application 1540. The applications 1506 are programs that execute functions defined in the programs. Various programming languages can be employed to create one or more of the applications 1506, structured in a variety of manners, such as object-oriented programming languages (e.g., Objective-C, Java, or C++) or procedural programming languages (e.g., C or assembly language). In a specific example, the third-party application 1540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1540 can invoke the API calls 1550 provided by the operating system 1512 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium"

and "signal medium" mean the same thing and may be used interchangeably in this disclosure.

What is claimed is:

1. A method, comprising:
receiving, from a first client device, a set of requests for recording user activity detected on a mobile application executing on the first client device, wherein each request includes information corresponding to a set of events based on the user activity that has occurred on the mobile application, the set of requests for recording user activity is sent by a session replay software development kit (SDK) installed on the first client device, the set of requests being received by a data transformation (DT) pipeline;
sending, by the DT pipeline, the set of requests to a mobile event transformer service for performing a set of transformation operations on the set of requests, the performing comprising:
transforming, by the mobile event transformer service, the first set of information from first request in a first format to a particular format compatible with a session player application programming interface (API), the particular format being different than the first format;
determining that a first request from the set of requests includes a change in position for an element of a screen of the mobile application, the first request including a first set of information in a first format, the first set of information comprising first information indicating a type of event and second information indicating the change in position;
determining, from the first set of information from the first request, a previous timestamp of a set of previous properties including a previous change in position for the element of the screen;
determining a transition time between a current timestamp and the previous timestamp;
generating, using a style sheet language, a linear transition based at least in part on the transition time; and
adding the linear transition to a style of a markup language element corresponding to the element, the markup language element being in a second format different than the first format.

2. The method of claim 1, wherein the element is associated with a particular recording identifier.

3. The method of claim 1, wherein the change in position comprises a change in an x coordinate.

4. The method of claim 1, wherein the change in position comprises a change in a y coordinate.

5. The method of claim 1, wherein set of requests includes a number of events based on an operating system of the first client device.

6. The method of claim 5, wherein the operating system comprises a first operating system, and the number of events comprises a first number of frames per second.

7. The method of claim 5, wherein the operating system comprises a second operating system, and the number of events comprises a second number of frames per second.

8. The method of claim 1, wherein the change in position for the element corresponds to a scrolling event on the screen.

9. The method of claim 1, wherein the change in position is expressed as relative to the previous change in position for the element.

10. The method of claim 1, wherein the first format comprises JSON and the second format comprises CSS, providing the markup language element to a session player application, the session player application utilizing the session player API for rendering the markup language element in an iframe of an HTML document.

11. A system comprising:
a processor; and
a memory storing instructions that, when executed by the processor, configure the system to perform operations comprising:
receiving, from a first client device, a set of requests for recording user activity detected on a mobile application executing on the first client device, wherein each request includes information corresponding to a set of events based on the user activity that has occurred on the mobile application, the set of requests for recording user activity is sent by a session replay software development kit (SDK) installed on the first client device, the set of requests being received by a data transformation (DT) pipeline;
sending, by the DT pipeline, the set of requests to a mobile event transformer service for performing a set of transformation operations on the set of requests, the performing comprising:
transforming, by the mobile event transformer service, the first set of information from first request in a first format to a particular format compatible with a session player application programming interface (API), the particular format being different than the first format;
determining that a first request from the set of requests includes a change in position for an element of a screen of the mobile application, the first request including a first set of information in a first format, the first set of information comprising first information indicating a type of event and second information indicating the change in position;
determining, from the first set of information from the first request, a previous timestamp of a set of previous properties including a previous change in position for the element of the screen;
determining a transition time between a current timestamp and the previous timestamp;
generating, using a style sheet language, a linear transition based at least in part on the transition time; and
adding the linear transition to a style of a markup language element corresponding to the element, the markup language element being in a second format different than the first format.

12. The system of claim 11, wherein the element is associated with a particular recording identifier.

13. The system of claim 11, wherein the change in position comprises a change in an x coordinate.

14. The system of claim 11, wherein the change in position comprises a change in a y coordinate.

15. The system of claim 11, wherein set of requests includes a number of events based on an operating system of the first client device.

16. The system of claim 15, wherein the operating system comprises a first operating system, and the number of events comprises a first number of frames per second.

17. The system of claim 15, wherein the operating system comprises a second operating system, and the number of events comprises a second number of frames per second.

18. The system of claim 11, wherein the change in position for the element corresponds to a scrolling event on the screen.

19. The system of claim 11, wherein the change in position is expressed as relative to the previous change in position for the element.

20. The system of claim 11, wherein the operations further comprise:
providing the markup language element to a session player application for rendering in an iframe of an HTML, document.

21. A non-transitory computer-readable storage medium, the computer-readable storage medium including instructions that when executed by a computer, cause the computer to perform operations comprising:
receiving, from a first client device, a set of requests for recording user activity detected on a mobile application executing on the first client device, wherein each request includes information corresponding to a set of events based on the user activity that has occurred on the mobile application, the set of requests for recording user activity is sent by a session replay software development kit (SDK) installed on the first client device, the set of requests being received by a data transformation (DT) pipeline;
sending, by the DT pipeline, the set of requests to a mobile event transformer service for performing a set of transformation operations on the set of requests, the performing comprising:
transforming, by the mobile event transformer service, the first set of information from first request in a first format to a particular format compatible with a session player application programming interface (API), the particular format being different than the first format;
determining that a first request from the set of requests includes a change in position for an element of a screen of the mobile application, the first request including a first set of information in a first format, the first set of information comprising first information indicating a type of event and second information indicating the change in position;
determining, from the first set of information from the first request, a previous timestamp of a set of previous properties including a previous change in position for the element of the screen;
determining a transition time between a current timestamp and the previous timestamp;
generating, using a style sheet language, a linear transition based at least in part on the transition time; and
adding the linear transition to a style of a markup language element corresponding to the element, the markup language element being in a second format different than the first format.

22. The non-transitory computer-readable storage medium of claim 21, wherein the element is associated with a particular recording identifier.

23. The non-transitory computer-readable storage medium of claim 21, wherein the change in position comprises a change in an x coordinate.

24. The non-transitory computer-readable storage medium of claim 21, wherein the change in position comprises a change in a y coordinate.

25. The non-transitory computer-readable storage medium of claim 21, wherein set of requests includes a number of events based on an operating system of the first client device.

26. The non-transitory computer-readable storage medium of claim 25, wherein the operating system comprises a first operating system, and the number of events comprises a first number of frames per second.

27. The non-transitory computer-readable storage medium of claim 25, wherein the operating system comprises a second operating system, and the number of events comprises a second number of frames per second.

28. The non-transitory computer-readable storage medium of claim 21, wherein the change in position for the element corresponds to a scrolling event on the screen.

29. The non-transitory computer-readable storage medium of claim 21, wherein the change in position is expressed as relative to the previous change in position for the element.

30. The non-transitory computer-readable storage medium of claim 21, further comprising:
providing the markup language element to a session player application for rendering in an iframe of an HTML, document.

* * * * *

UNITED STATES PATENT AND TRADEMARK OFFICE
CERTIFICATE OF CORRECTION

PATENT NO. : 11,954,421 B2
APPLICATION NO. : 18/103822
DATED : April 9, 2024
INVENTOR(S) : Debize et al.

It is certified that error appears in the above-identified patent and that said Letters Patent is hereby corrected as shown below:

In the Specification

In Column 2, Line 52, delete "web site" and insert --website-- therefor

In Column 4, Line 47, delete "web site," and insert --website,-- therefor

In Column 6, Line 48, delete "web site" and insert --website-- therefor

In Column 13, Line 33, delete "web site" and insert --website-- therefor

In Column 13, Line 35, delete "web site" and insert --website-- therefor

In the Claims

In Column 35, Line 8, in Claim 20, delete "HTML," and insert --HTML-- therefor

In Column 36, Line 41, in Claim 30, delete "HTML," and insert --HTML-- therefor

Signed and Sealed this
Seventh Day of January, 2025

Derrick Brent
*Acting Director of the United States Patent and Trademark Office*